US012717081B2

(12) United States Patent
Vulovic et al.

(10) Patent No.: US 12,717,081 B2
(45) Date of Patent: Aug. 25, 2026

(54) TEMPERATURE INSENSITIVE WAVEGUIDES AND ARRAY WAVEGUIDE GRATING MUX/DEMUX DEVICES

(71) Applicant: Intel Corporation, Santa Clara, CA (US)

(72) Inventors: Boris Vulovic, Campbell, CA (US); Wenhua Lin, Fremont, CA (US); Wei Qian, Walnut, CA (US); Tiehui Su, San Jose, CA (US); Nutan Gautam, Los Gatos, CA (US); Mehbuba Tanzid, San Jose, CA (US); Hao-Hsiang Liao, Fremont, CA (US)

(73) Assignee: Intel Products IP LLC, Santa Clara, CA (US)

( * ) Notice: Subject to any disclaimer, the term of this patent is extended or adjusted under 35 U.S.C. 154(b) by 251 days.

(21) Appl. No.: 17/747,929

(22) Filed: May 18, 2022

(65) Prior Publication Data

US 2022/0276437 A1 Sep. 1, 2022

(51) Int. Cl.
*G02B 6/12* (2006.01)
*G02B 6/122* (2006.01)

(52) U.S. Cl.
CPC ..... *G02B 6/12028* (2013.01); *G02B 6/12026* (2013.01); *G02B 6/122* (2013.01)

(58) Field of Classification Search
CPC . G02B 6/12026; G02B 6/12028; G02B 6/122
See application file for complete search history.

(56) References Cited

U.S. PATENT DOCUMENTS 6,987,895 B2 * 1/2006 Johannessen ...... G02B 6/12007 385/27
2002/0122650 A1 * 9/2002 Kominato .......... G02B 6/12011 385/131

(Continued)

FOREIGN PATENT DOCUMENTS

CN 109239843 A * 1/2019

OTHER PUBLICATIONS

"AZO Materials," Webpage , 1 page, May 18, 2022, retrieved from Internet.

(Continued)

*Primary Examiner* — Michael Stahl
(74) *Attorney, Agent, or Firm* — Akona IP PC

(57) ABSTRACT

Thermally compensated waveguides are disclosed herein. According to one aspect, the present disclosure proposes new ways to combine negative TOC (NTOC) material layers within the waveguides. NTOC materials can be implemented in one or more of a cladding layer, a core rib/channel waveguide, a horizontally segmented waveguide, a vertically segmented waveguide, a sub-wavelength grating structure, and/or in various other waveguide structure implementations including arbitrary core or cladding shapes. The integration of NTOC materials improves the temperature dependence of the waveguide spectrum. The need for fast and efficient optical-based technologies is increasing as Internet data traffic growth rate is overtaking voice traffic, pushing the need for optical communications. The new waveguide structures can be integrated into waveguides, individual devices, integrated devices like arrayed waveguide grating devices, and photonic integration circuits (PICs), decreasing temperature dependence of such devices and circuits.

20 Claims, 23 Drawing Sheets

(56) References Cited

U.S. PATENT DOCUMENTS

| | | | | |
|---|---|---|---|---|
| 2003/0108273 | A1 * | 6/2003 | Kowalczyk | G02F 1/065 385/140 |
| 2011/0002578 | A1 * | 1/2011 | Nakada | B29D 11/00663 359/341.1 |
| 2011/0103415 | A1 * | 5/2011 | Rasras | G02B 6/4215 250/214 R |
| 2022/0099890 | A1 * | 3/2022 | Grillanda | G02B 6/12016 |

OTHER PUBLICATIONS

Cheben, Pavel et al "Subwavelength integrated photonics", Nature 560.7720, Aug. 30, 2018, 565-572.

Feng, Shaoqi et al "Athermal silicon ring resonators clad with titanium dioxide for 1.3 μm wavelength operation", Optics Express vol. 23, No. 20 (2015), pp. 25653-25660.

Goh, Takashi et al "Estimation of Waveguide Phase Error in Silica-based Waveguides", Journal of Lighwave Technology, vol. 15, No. 11, Nov. 1997, 2107-2113.

Heise, G. et al "Optical Phased Array Filter Module with Passively Compensated Temperature Dependence", ECOC 98, pp. 319-320, Sep. 20-24, 1998, Madrid, Spain.

Ibrahim, Marc et. al "Athermal silicon waveguides with bridged subwavelength gratings for TE and TM polarizations", Optics Express vol. 20 No. 16, Jul. 26, 2012, pp. 18356-18361.

Martham, Susan Kavita et al "Refractive index modification of SU-8 polymer based waveguide via fabrication parameters", IEEE Student Conf on R and D (2014), 5 pages.

Namnabat, Soha et al "Passive athermal silicon ring resonators with sol-gel claddings", OFC (2016), 3 pages.

Schmid, J.H et.al "Temperature-independent silicon subwavelength grating waveguides", Opt. Lett. 36, Jun. 1, 2011, 2110-2112.

Smit, Meint K. et al "PHASAR-Based WDM-Devices: Principles, Design and Applications", IEE Journal of Selected Topics in Quantum Electronics, vol. 2, No. 2, Jun. 1996, pp. 236-250.

Ye, Winnie N. et al "Athermal high-index-contrast waveguide design", IEEE Photonics Technology Letters, vol. 20, No. 11, Jun. 1, 2008, pp. 885-887885-887].

Youn, Sung-Won et al "Microstructuring of SU-8 photoresist by UV-assisted thermal imprinting with non-transparent mold" Microelectronic Engineering 85.9 (2008), 1924-1931.

* cited by examiner 1900
1960
1950
1910

TEMPERATURE INSENSITIVE WAVEGUIDES AND ARRAY WAVEGUIDE GRATING MUX/DEMUX DEVICES

BACKGROUND

Along with popularization of the Internet and electronic mail, utilization of communication networks increases remarkably, so that optical communication systems allowing a large capacity of information transmission have been developed. Optical wavelength multiplexing-demultiplexing (MUX/DEMUX) devices are key to improving a degree of wavelength-division multiplexing in optical communication systems. An optical wavelength MUX/DEMUX device having an optical waveguide structure of an array grating type may be provided as a passive structure that has a relatively narrow transmission width and a relatively high extinction ratio. Furthermore, such an optical wavelength MUX/DEMUX device has also a characteristic feature of capable of multiplexing and demultiplexing a number of optical signals.

Wavelength-division multiplexing (WDM) optical networks and systems have become a major technology in fiber optic backbones, data center interconnects and long-distance data transmission. Arrayed Waveguide Gratings (AWGs) are commonly used in WDM systems as optical wavelength MUX/DEMUX devices, e.g., deployed in integrated silicon photonics sensors or transceivers. AWGs are capable of multiplexing many wavelengths into a single optical fiber, thereby increasing the transmission capacity of optical networks considerably.

AWG MUX/DEMUX devices are based on a fundamental principle of optics that light waves of different wavelengths do not interfere linearly with each other. This means that, if each channel in an optical communication network makes use of light of a slightly different wavelength, then the light from many of these channels can be carried by a single optical fiber with negligible crosstalk between the channels. The AWGs are used to multiplex channels of several wavelengths onto a single optical fiber at the transmission end and are also used as demultiplexers to retrieve individual channels of different wavelengths at the receiving end of an optical communication network.

AWG spectrum stability is key to the success of using waveguides and AWG MUX/DEMUX devices to enable low loss and low crosstalk performance. AWG spectrum stability may be compromised due to, e.g., fabrication process variations within a given wafer or wafer-to-wafer. Temperature variations inherent to some environments, such as data centers, may further compromise the spectrum stability, especially when silicon photonics devices are used to implement optical waveguides and AWG MUX/DEMUX devices because silicon is highly sensitive to temperature variations. To accommodate these variations, AWGs with wide flat-top spectral shapes have been designed. Further improvements are always desirable.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 19 is a cross-sectional view of a waveguide, according to some embodiments of the present disclosure.

FIG. 20 is a cross-sectional view of a waveguide, according to some embodiments of the present disclosure.

FIG. 21 is a cross-sectional view of a waveguide, according to some embodiments of the present disclosure.

FIG. 22 is a cross-sectional view of a waveguide, according to some embodiments of the present disclosure.

FIG. 23 is a cross-sectional view of a waveguide, according to some embodiments of the present disclosure.

FIG. 24 is a cross-sectional view of a waveguide, according to some embodiments of the present disclosure.

DETAILED DESCRIPTION

Overview

Figure 1:
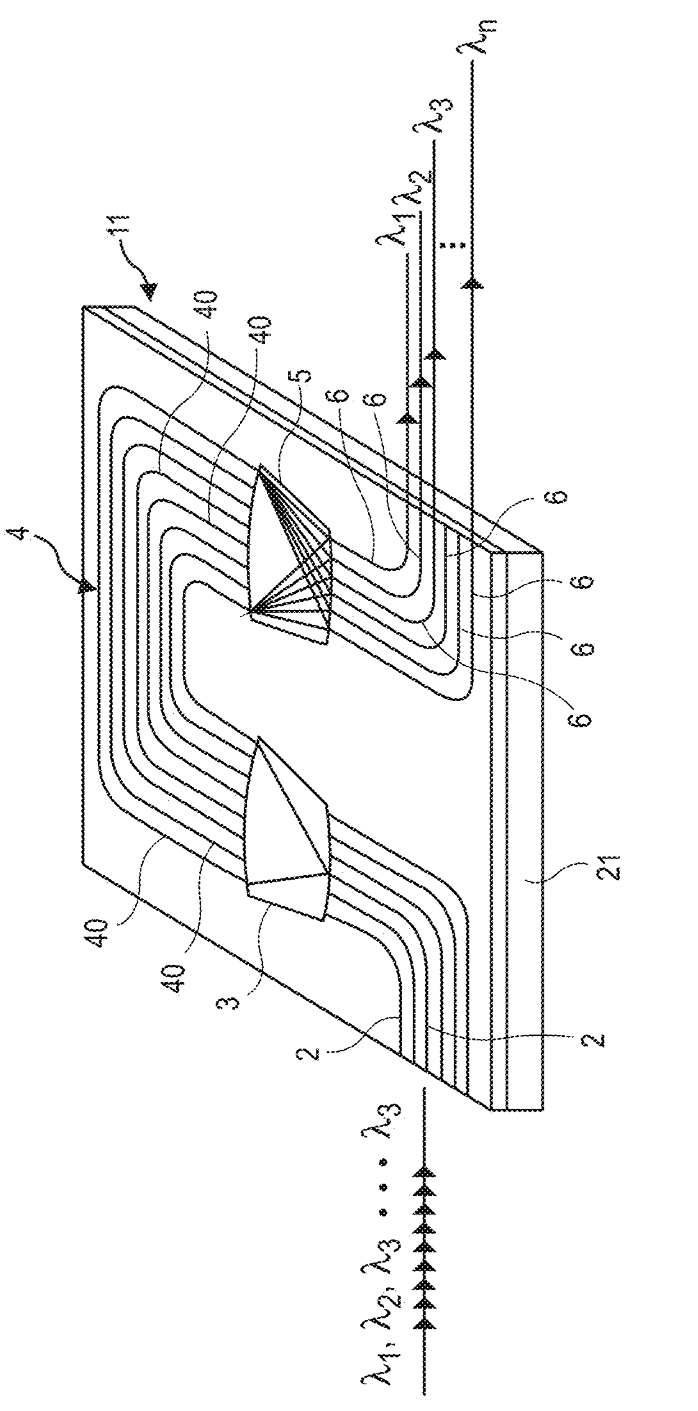
FIG. 1 is an isometric view of an example AWG, according to some embodiments of the present disclosure.

Embodiments of the present disclosure relate to optical waveguides (in the following referred to, simply, as "waveguides") and AWGs used as optical wavelength MUX/DEMUX devices, and to optical communication systems and photonic integrated circuits (PIC) using waveguides and AWG MUX/DEMUX devices. Embodiments of the present disclosure may help minimize the temperature variation of the AWG spectrum, which may allow to relax the requirements for very wide-band AWGs and allow for greater fabrication process variations.

For purposes of illustrating waveguides and AWG MUX/DEMUX devices described herein, it is important to understand phenomena that may come into play during the operation thereof. The following foundational information may be viewed as a basis from which the present disclosure may be properly explained. Such information is offered for purposes of explanation only and, accordingly, should not be construed in any way to limit the broad scope of the present disclosure and its potential applications.

As briefly described above, AWG spectrum stability (i.e., minimizing wavelength shifts of AWG spectrum) is crucial for optical networks and systems, e.g., WDM networks and systems. Wavelength shift of the AWG spectrum is not trivial because the length dilation waveguide is very small, which can make efficient separation of colors in an optical device difficult. The result can be an increase in channel crosstalk and insertion loss. When this happens, the optical device (e.g., AWG, PIC, etc.) may not be able to efficiently recover the information from the optical data stream.

In the example context of AWG, wavelength shift of the AWG spectrum degrades insertion loss (IL) and total crosstalk (TXT) of the device of an ideally centered spectrum of an AWG. Around each of the four coarse divisional wavelength-division multiplexing (CWDM) channels (1271 nm, 1291 nm, 1311 nm, 1331 nm) there is a so-called clear window (CW) of 15 nm (as an example) used to define insertion loss and crosstalk. The CW can be thought of as a box around each channel center. The insertion loss of a channel is the worst transmission within the given channel's CW. This will be discussed in greater detail later in the disclosure.

Physically, the shift of the spectrum can be caused by either 1) fabrication process variation (e.g. width of the array waveguide is not the same across the wafer or is not the same from one wafer to another wafer, similar goes for the waveguide height and refractive indices of all the layers used to create the AWG) or by 2) temperature variation. Additionally, the laser wavelength can vary (usually ±6.5 nm), for example, due to thermal drift, etc. So, the cumulative effect can be very larger, e.g., 15 nm in case temperature variation is 1 nm and process variation is 1 nm (13 nm+1 nm+1 nm=15 nm).

To compensate for these variations and ensure the specifications for IL and TXT are met, AWGs are designed with very wide flat-top channel shapes, in the case of 15 nm variation the AWG 1 dB bandwidth has to be at least 15 nm. Such large bandwidths are achieved by widening the AWG's output multi-mode waveguides. This in turn has consequence of enlarging the overall AWG footprint which is undesirable, as the size of the footprint is often limiting factor for integration. Additionally, AWGs with larger footprint and longer array waveguide have larger phase error and hence larger TXT.

Embodiments of the present disclosure provide new ways to combine negative thermo-optic coefficient (TOC) (NTOC) material layers within the waveguides, and especially of the array waveguide area of the AWG. Negative TOC (NTOC) materials can be implemented as cladding layer, core rib/channel waveguide, horizontally segmented waveguide, vertically segmented waveguide, sub-wavelength grating structure (layers of usual materials stacked with NTOC material) in various waveguide structure implementation including arbitrary core or cladding shape. The new waveguide structures can be integrated into waveguide, individual device, integrated device like AWG, and PICs, resulting in temperature-independent device and PICs.

This present disclosure helps completely or almost completely eliminate the temperature dependence of the AWG spectrum which is desirable as it relaxes the bandwidth required for the AWG design. The relaxation in the requirement for the bandwidth can be utilized either to design smaller footprint device (narrower bandwidth) or to compensate for more fabrication process induced variations in the position of the spectrum. Devices according to various embodiments of the present disclosure can be fabricated using the existing silicon photonics manufacturing fab or using the modified process. The idea can be one of the key solutions for high yield temperature-independent Demux based receiver for SPPD's CWDM4/FR4 transceiver for data center.

Each of the structures, assemblies, packages, methods, devices, and systems of the present disclosure may have several innovative aspects, no single one of which being solely responsible for all of the desirable attributes disclosed herein. Details of one or more implementations of the subject matter described in this specification are set forth in the description below and the accompanying drawings.

In the following detailed description, various aspects of the illustrative implementations may be described using terms commonly employed by those skilled in the art to convey the substance of their work to others skilled in the art. For example, the term "connected" means a direct connection (which may be one or more of a mechanical, electrical, and/or thermal connection) between the things that are connected, without any intermediary devices, while the term "coupled" means either a direct connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20% of a target value (e.g., within +/−5 or 10% of a target value) based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. When used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

In the drawings, same reference numerals refer to the same or analogous elements/materials shown so that, unless stated otherwise, explanations of an element/material with a given reference numeral provided in context of one of the drawings are applicable to other drawings where element/materials with the same reference numerals may be illustrated. Furthermore, in the drawings, some schematic illustrations of example structures of various structures, devices, and assemblies described herein may be shown with precise right angles and straight lines, but it is to be understood that such schematic illustrations may not reflect real-life process limitations which may cause the features to not look so "ideal" when any of the structures described herein are examined using, e.g., images of suitable characterization tools such as scanning electron microscopy (SEM) images, transmission electron microscope (TEM) images, or non-contact profilometers. In such images of real structures, possible processing and/or surface defects could also be visible, e.g., surface roughness, curvature or profile deviation, pit or scratches, not-perfectly straight edges of materials, tapered vias or other openings, inadvertent rounding of corners or variations in thicknesses of different material layers, occasional screw, edge, or combination dislocations within the crystalline region(s), and/or occasional dislocation defects of single atoms or clusters of atoms. There may be other defects not listed here but that are common within the field of device fabrication and/or packaging.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

A Thermally Compensated AWG

AWGs are frequently used in the optical communications field. FIG. 1 is an isometric view of an example array waveguide grating, according to some embodiments of the present disclosure. The AWG comprises one or more optical input waveguides 2 arranged side-by-side (a plurality optical input waveguides are shown in the figure), a first slab waveguide 3 connected to output sides of the optical input waveguides 2, an arrayed waveguide 4 connected to the output side of the first slab waveguide 3, a second slab waveguide 5 connected to the output side of the arrayed waveguide 4 and one or more optical output waveguides 6 arranged side-by-side (a plurality optical output waveguides are shown in the figure).

The arrayed waveguide 4 is provided for propagating light output from the first slab waveguide 3 and has a plurality of waveguides (e.g., channel, ribs, etc.) 40 arranged side-by-side. Adjacent waveguides 40 are different in length by a predetermined length (ΔL) and the arrayed waveguide 4 gives each signal a phase difference in the AWG 11. Typically, the arrayed waveguide 4 includes a large number of waveguides 40 or, for example, 100 waveguides, however in the figure, a small number of waveguides 40 are only shown for easy illustration.

In the AWG 11, for example, when a wavelength-division multiplexed optical signal comprising signals having wavelengths λ1, λ2, λ3, . . . , λn enters one optical input waveguide 2, this signal passes through the optical input waveguide 2 into the first slab waveguide 3. Then, the signal is diffracted and spread by the first slab waveguide 3 and is transmitted to the arrayed waveguide 4 to propagate therethrough.

After passing through the arrayed waveguide 4, the signals enter the second slab waveguide 5, converge on and then are output from optical output waveguides 6. As the channel waveguides 40 of the arrayed waveguide 4 are all different in length, a phase difference appears in each of the signals that have passed through the arrayed waveguide 4. Due to this phase difference, the wave fronts of the signals tilt and this tilt angle determines focal points of the signals. For this reason, the focal points of the signals having different wavelengths differ from each other and accordingly the optical output waveguides 6 are formed at the respective focal points. With this configuration, the signals of different wavelengths are extracted by the optical output waveguides 6, respectively, thereby completing the function as a wavelength-division demultiplexer of the AWG.

Moreover, as the AWG takes advantage of the principle of reversibility of the optical circuit, the AWG also handles the function as a wavelength-division multiplexer as well as a wavelength-division demultiplexer. That is, reversing the above-described procedure, when signals having differing wavelengths λ1, λ2, λ3, . . . , λn enter respective optical output waveguides 6, the signals pass through the above-mentioned propagation path in reverse, the signals are multiplexed by the second slab waveguide 5, the arrayed waveguide 4 and the first slab waveguide 3 and output from one optical input waveguide 2.

Generally, as the AWG is made of silica-based glass, there occurs temperature fluctuation due to the temperature-dependent refractive index of the silica-based material. Specifically, as ambient temperature changes where the AWG is placed, the light transmission center wavelength (center wavelength) of the AWG changes dependently on the temperature, causing a shift of the center wavelength of about 0.8 nm over the general operating temperature range (−5° C. through 70° C.). In view of this, there was the need to control the temperature of the AWG chip as a whole.

Thus, there was a great demand for temperature independence (insensitivity) of the AWG, and recently, the technique of compensating the temperature dependence of the center wavelength has been explored (development of an athermal AWG). This technique has realized temperature-control-free AWG and no electric power supply.

Uncompensated AWG Spectra

The temperature variation of the AWG spectrum can be understood from the focusing equation (Eq. 1) for AWGs [1]:

$$\lambda_c(T) = \frac{\Delta L(T)}{m} n_{eff}(T) \qquad \text{(Eq. 1)}$$

In (Eq. 1) m is the grating order of the AWG, it is a fixed real number and does not depend on the temperature; $n_{eff}$ is the effective index of the fundamental mode of the grating waveguide which depends on the temperature through the TOC of each material (core and claddings); ΔL is the length difference between the adjacent array waveguides in the AWG which can depend on the temperature through the thermal expansion coefficient. Finally, $\lambda_c$ is the central wavelength of the AWG which depends on temperature through the parameter on the right-hand side of (Eq. 1). One skilled in the art will note that the focus is on the influence of the temperature variation on the variation of the effective index of the fundamental mode in the array waveguide.

Figure 2:
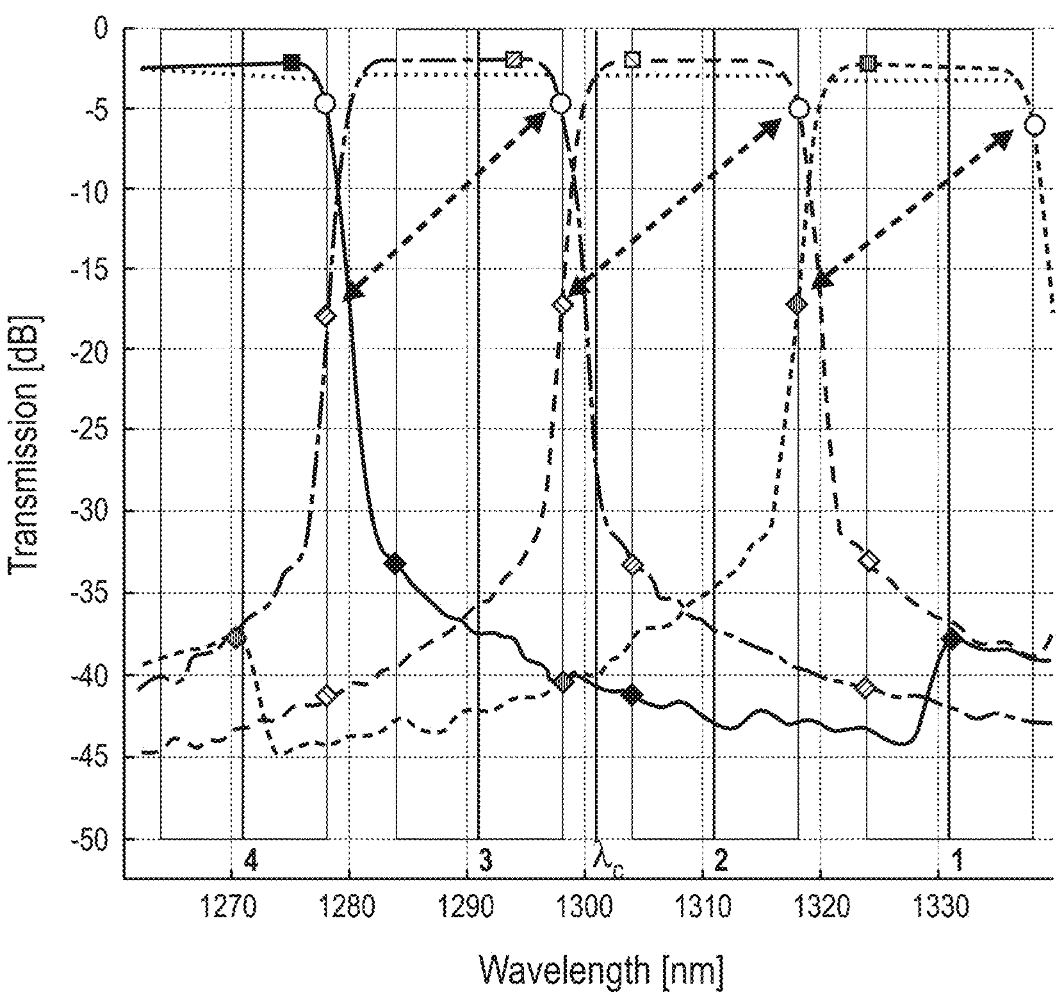
FIG. 2 is a graph which shows a 2 nanometer (nm) shifted spectrum of a temperature sensitive AWG, according to some embodiments of the present disclosure.

FIG. 2 is a graph which shows −2 nm shifted spectrum from a temperature sensitive AWG, according to some embodiments of the present disclosure. In the present example, the spectrum of the AWG is shifted (for −2 nm in this case), the insertion loss will degrade since the CWDM channel centers and corresponding CW are on fixed positions so the position of the minimum transmission within the CW (i.e. the IL) gets worse. WDM is a technology which multiplexes a number of optical carrier signals onto a single optical fiber by using different wavelengths (i.e., colors) of laser light. This technique also enables bidirectional communications over a single strand of fiber, also called wavelength-division duplexing, as well as multiplication of capacity.

The pernicious effects are illustrated in the shifted spectrum plot in panel of FIG. 2 for the case of −2 nm wavelength shift (negative is toward the shorter wavelengths). As stated, IL is defined as the lowest point (most loss) within the CW for a given wavelength. In the present embodiment illustrated in the graph of FIG. 2, the IL occurs along the right side of each CW—specifically, where the round dot denotes their location. It is visible that the circular dots (IL) are at lower values of the transmission compared to an unshifted spectrum where the circular dots (IL) nominally lay on the flat-top of the CW. Furthermore, there is the effect of the shift on the crosstalk. The crosstalk from channel “a” to channel “b” is defined as the difference between the IL of channel “a” (circular dot) and the highest transmission of channel “a” in the CW of channel “b” (diamond marker of the same color as channel “a”). Total crosstalk (TXT) for channel “a” is the sum of the crosstalk to all other channels.

Comparing the positions of the IL circular dots and crosstalk diamond, we observe obviously much worse crosstalk during a −2 nm for channels 2, 3 and 4 which are indicated with dashed arrows in both panels. That is, the dashed arrows in indicate the channel-to-channel crosstalk for the given channels. Here, shorter dashed arrow length means worse crosstalk value. Hence, we conclude that both IL and TXT are deteriorated by shifting the AWG spectrum from the ideally centered position.

The goal is to make the AWG center wavelength temperature insensitive to temperature, and for that we examine the temperature dependence of the two parameters on the right-hand side. The thermal coefficients of expansion are about two orders of magnitude smaller than the TOC; this can also be seen in Table 1.

TABLE 1 enumerates TOC, refractive index, and thermal expansion coefficient for some materials of interest.

| Material | $\frac{dn}{dT}[10^{-4}K^{-1}]$ | n | $\frac{dL}{dT}[10^{-6}K^{-1}]$ |
|---|---|---|---|
| Si | +1.8 to +2.3 | 3.501 | +2.6 |
| $Si_3N_4$ | +0.4 | 1.988 | +1.4 to +3.7 |
| $SiO_2$ | +0.1 | 1.48 | +0.55 to +0.75 |
| SU-8 polymer | −1.1 | 1.57-1.59 | +51 |

Although 1 nm of spectra variation might not seem large (see SU-8), in coarse wavelength CWDM applications (4 wavelength channels with 20 nm spacing) where laser spectral variation is 13 nm and fabrication process induced variations are about 1 nm, the total minimal bandwidth is the sum of the three, 15 nm, which is 75% of the 20 nm channel spacing making very hard to design acceptable footprint size AWGs.

Compensated AWG Spectra

Figure 3:
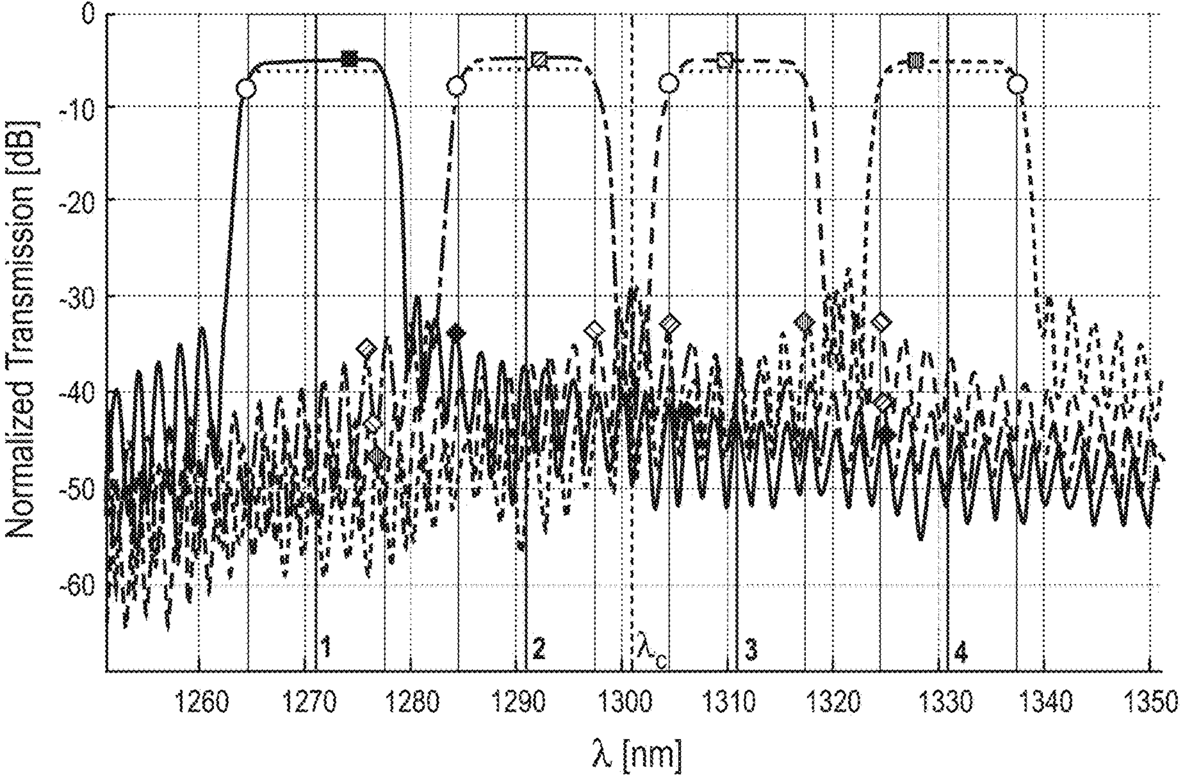
FIG. 3 is a graph which shows a spectrum of a temperature insensitive AWG, according to some embodiments of the present disclosure.

FIG. 3 is a graph which shows a spectrum from a temperature insensitive AWG, according to various embodiments of the present disclosure. Thermally compensated AWG spectrum is at temperature T=80° C. The center wavelength shift compared to T=20° C. case is −0.1 nm only. From the results of the compensated AWG of FIG. 3 with t=0.6 um SU-8 cladding is that the spectrum center does not move from 1301 nm value at T=20° C. when temperature is lowered to T=0° C. Also, the spectrum moves only a bit to 1301 nm-0.1 nm=1300.9 nm value at T=80° C. This is significant improvement in compensating variation of the environmental temperature in comparison with the uncompensated (i.e., standard) AWG depicted in FIG. 2. The mechanics to achieve these results will be discussed in greater detail later in the disclosure.

A Partially Compensated Waveguide

Figure 4:
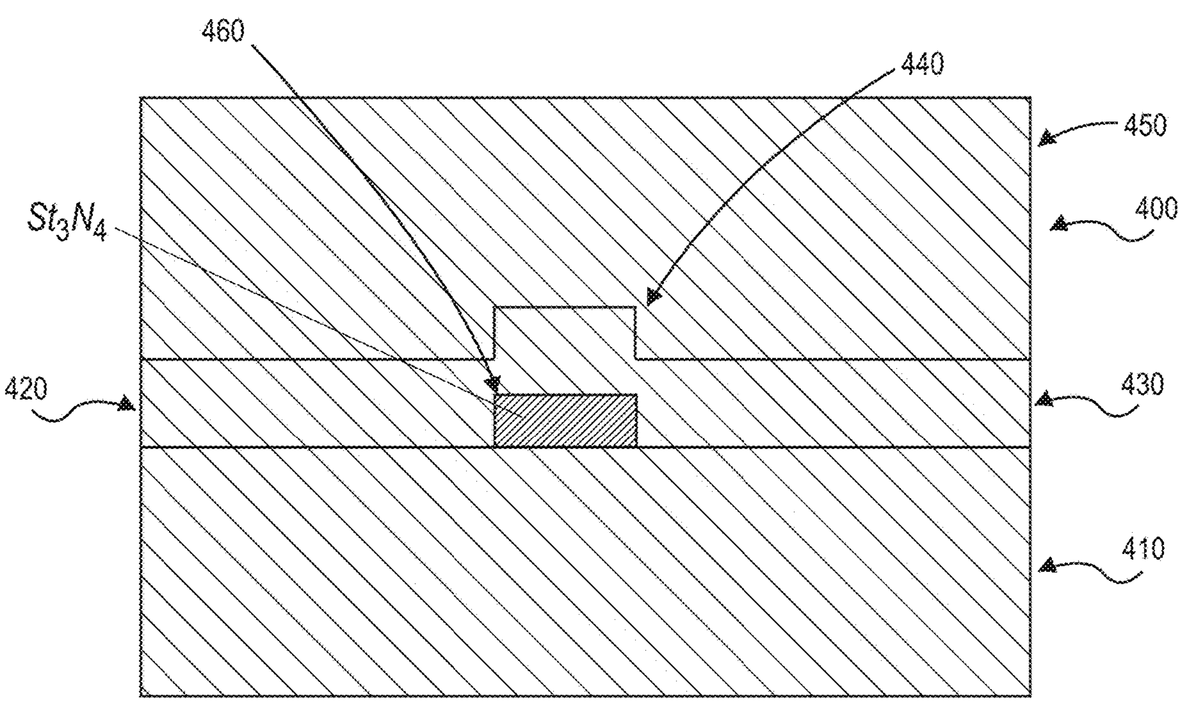
FIG. 4 is a cross-sectional view of a waveguide, according to some embodiments of the present disclosure.

FIG. 4 is a cross-sectional side view of a waveguide, according to some embodiments of the present disclosure. Waveguide 400 comprises lower cladding 410, left middle cladding 420, right middle cladding 430, center middle cladding 440, upper cladding 450, and core 460. In one or more embodiments, the effective index (Neff) of the fundamental mode of the array waveguide on a given wavelength depends on material refractive indices of all layers and the geometry of the waveguide (usually, height and width). Standard silicon nitride waveguide with silicon dioxide cladding (both top and bottom cladding) is shown in FIG. 4. The material refractive indices are given in the Table 1. In the present embodiment, lower cladding 410, left middle cladding 420, right middle cladding 430, upper cladding 450, are made of glass, although other materials and configurations are not beyond the scope of the present disclosure which will be discussed in greater detail below.

FIG. 4 exemplifies a structure of a typical photonic waveguide without complete temperature insensitivity. That is, it exhibits some temperature sensitivity. Core material is of higher refractive index than the cladding or claddings. For the purpose of demonstrating the proposed procedure we'll take concrete materials: core is Si3N4 and cladding is all SiO2 (oxide). This is referred to this structure as "Standard waveguide." In one or more embodiments, the effective refractive index as a function of temperature is calculated using numerical methods, particularly in software. Numerical methods can be used to the calculated the thermo-optic properties of the device as a whole as a subsection with predetermined boundary conditions.

Mode Concentration of a Partially Compensated Waveguide

Figure 5:
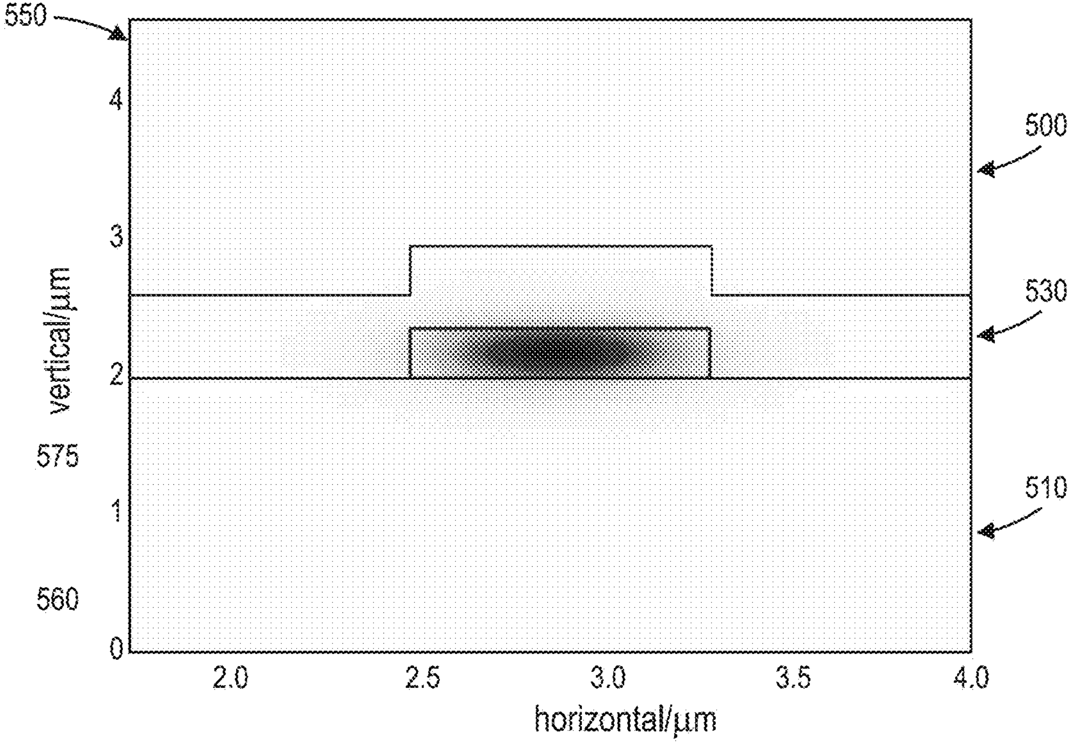
FIG. 5 is a cross-sectional view depicting the concentration of modes in a waveguide, according to some embodiments of the present disclosure.

FIG. 5 is a cross-sectional view depicting the concentration of modes in a waveguide, according to some embodiments of the present disclosure. Waveguide 500 comprises lower cladding 510, middle cladding 530, upper cladding 550, and core 560. The profile of the fundamental mode 575 calculated for the waveguide in FIG. 4 is shown in FIG. 5. An optical waveguide is a physical structure that guides electromagnetic waves in the optical spectrum. Common types of optical waveguides include optical fiber waveguides, transparent dielectric waveguides made of plastic and glass, liquid light guides, and liquid waveguides.

Optical waveguides are used as components in integrated optical circuits or as the transmission medium in local and long-haul optical communication systems. Waveguides, such as, optical fibers transmit light and signals for long distances with low attenuation and a wide usable range of wavelengths. The basic principles behind optical waveguides can be described using the concepts of geometrical or ray optics.

Light passing into a medium with higher refractive index bends toward the normal by the process of refraction. Take, for example, light passing from air into glass. Similarly, light traveling in the opposite direction (from glass into air) takes the same path, bending away from the normal. This is a consequence of time-reversal symmetry. Each ray in air can be mapped to a ray in the glass. There's a one-to-one correspondence. But because of refraction, some of the rays in the glass are left out. The remaining rays are trapped in the glass by a process called total internal reflection. They are incident on the glass-air interface at an angle above the critical angle. These extra rays correspond to a higher density of states in more-advanced formulations based on the Green's function.

Using total internal reflection, we can trap and guide the light in a dielectric waveguide. The red rays bounce off both the top and bottom surface of the high index medium. They're guided even if the slab curves or bends, so long as it bends slowly. This is the basic principle behind fiber optics in which light is guided along a high index glass core in a lower index glass cladding. Optical waveguides can be classified according to their geometry (planar, strip, or fiber waveguides), mode structure (single-mode, multi-mode), refractive index distribution (step or gradient index), and material (glass, polymer, semiconductor). In one or more embodiments, waveguide 500 is a slab waveguide.

A dielectric slab waveguide, also called a planar waveguide. Owing to their simplicity, slab waveguides are often used in on-chip devices like AWG and acousto-optic filters and modulators. Typically, the slab waveguide consists of three layers of materials with different dielectric constants, extending infinitely in the directions parallel to their interfaces. Light is confined in the middle layer by total internal reflection if the refractive index of the middle layer is larger than that of the surrounding layers.

The slab waveguide is essentially a one-dimensional waveguide. It traps light only normal to the dielectric interfaces. For guided modes, the field in domain in the diagram is propagating and can be treated as a plane wave. The field in domains and evanescently decay away from the slab. This is evidences by fundamental mode 575 lobes which tail outside the core 560. The plane wave in domain bounces between the top and bottom interfaces at some angle typically specified by the β, the wave vector in the plane of the slab. Guided modes constructively interfere on one complete roundtrip in the slab. At each frequency, one or more modes can be found giving a set of eigenvalues (ω, β) which can be used to construct a band diagram or dispersion relation.

Because guided modes are trapped in the slab, they cannot be excited by light incident on the top or bottom interfaces. Light can be end-fire or butte coupled by injecting it with a lens in the plane of the slab. Alternatively, a coupling element may be used to couple light into the waveguide, such as a grating coupler or prism coupler.

As one skilled in the art can appreciate, to be a guided mode its modal effective index must be between the material refractive indices of the core and the cladding. Note that the mode profile overlaps (i.e. "samples") lower index cladding regions, more the overlap is pronounced closer the effective index is to the cladding value (approaching it from the larger values). Hence both core and cladding materials influence the value of the effective index and consequently its dependence on the temperature.

Effective Refractive Indices as a Function of Temperature

Figures 6A, 6B:
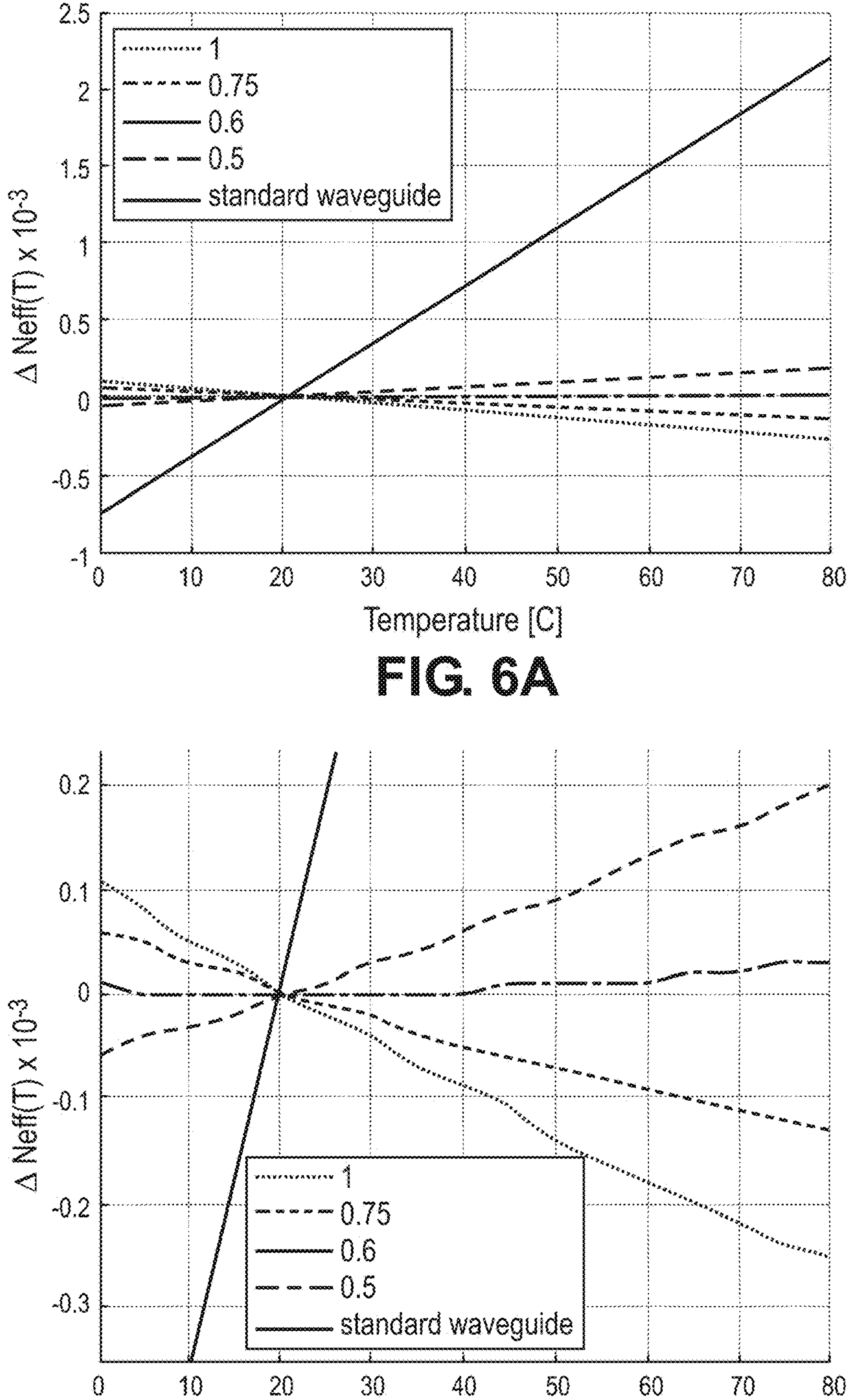
FIG. 6A is a graph showing an effective refractive index as a function of temperature, according to some embodiments of the present disclosure.
FIG. 6B is a graph showing an effective refractive index as a function of temperature, according to some embodiments of the present disclosure.
Figure 7:
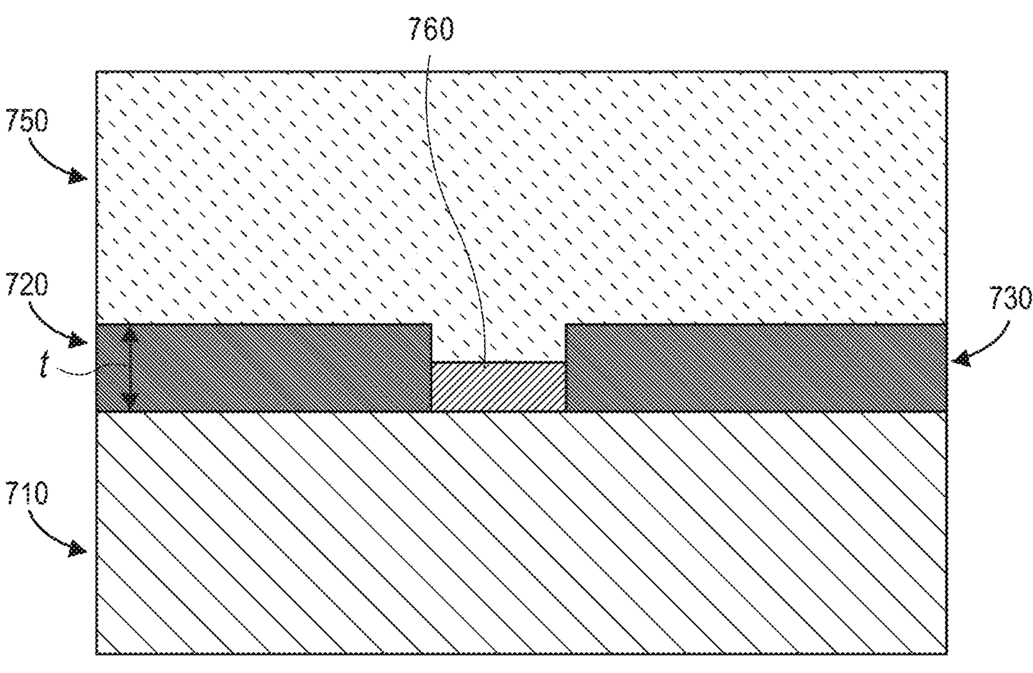
FIG. 7 is a cross-sectional view of a waveguide, according to some embodiments of the present disclosure.

FIGS. 6A-6B are graphs with differing scales (6B is a magnified section of 6B) showing an effective refractive index as a function of temperature, according to various embodiments of the present disclosure. FIGS. 6A-6B illustrated the fundamental mode effective index for various thicknesses of SU-8 polymer cladding and plot over temperature range from 0° C. to 80° C., with the intersection being the value at room temperature (20° C.). The calculations for various thicknesses "t" of the SU-8 middle cladding layer show that the optimal thickness in this case is t=0.6 μm. In this case, the improvement at 80° C. in ΔNeff is 74 times compared to the standard waveguide. Over the entire range 0° C. to 80° C., the improvement in ΔNeff is 98 times. FIG. 6B is the magnified section of FIG. 7 showing in more detail the cases of waveguides with negative TOC middle cladding layer.

While FIGS. 6A-6B are analyzed in the $TE_{00}$ mode, other modes, such as, $TM_{mn}$, $TE_{mn}$, TEM and hybrid are not beyond the scope of the present disclosure. As can be appreciated by one skilled in the art, modes in waveguides can be classified as follows. Transverse electromagnetic (TEM) modes are neither electric nor magnetic field in the direction of propagation. Transverse electric (TE) modes have no electric field in the direction of propagation. These are sometimes called H modes because there is only a magnetic field along the direction of propagation (H is the conventional symbol for magnetic field). Transverse magnetic (TM) modes have no magnetic field in the direction of propagation. These are sometimes called E modes because there is only an electric field along the direction of propagation. Hybrid modes have non-zero electric and magnetic fields in the direction of propagation.

In rectangular waveguides, rectangular mode numbers are designated by two suffix numbers attached to the mode type, such as $TE_{mn}$ or $TM_{mn}$, where m is the number of half-wave patterns across the width of the waveguide and n is the number of half-wave patterns across the height of the waveguide.

Various Compensated Waveguides Configurations

FIG. 7 is a cross-sectional view of a waveguide, according to some embodiments of the present disclosure. Waveguide 700 comprises lower cladding 710, left middle cladding 720, right middle cladding 730, upper cladding 750, and core 760. In order to minimize or completely temperature dependence of the modal effective index we propose to employ materials for core and claddings that have TOC of the opposite signs. In that case one can tune the material thicknesses so the resulting modal effective index is not dependent on temperature or at least it's minimally dependent on temperature. This is demonstrated in the example waveguide structure in FIG. 7, inter alia.

In one or more embodiments, core 760 material is Si3N4, bottom cladding 710 is oxide (BOX), top cladding 750 is air, and most importantly, one or middle claddings 720, 730 is negative TOC material, in this case SU-8 polymer of thickness "t" indicated in the figure. In this specific case, we have Si3N4 waveguide core 760 with SiO2 bottom cladding 710 and negative TOC material SU-8 polymer as immediate (middle) cladding 720 and/or 730, while above the SU-8 is air as the top cladding 750. In other embodiments, the top cladding comprises a material with a positive TOC.

Both SiO2 and Si3N4 have positive TOC and that will be compensate with the negative TOC of SU-8 polymer lying immediately on the top of the waveguide and hence lending itself to the contact (overlap) with the guided mode. The amount of the modal overlap with the negative TOC middle cladding is determined by the thickness "t" of the middle cladding. If "t" is too large, the negative TOC might overcompensate and make the modal effective index decrease with temperature. If "t" is too small it might not compensate enough, so the modal effective index still increases with the increase of temperature. Middle cladding of NTOC material can be removed from the top of the channel waveguide core. In practice, middle cladding is layered over core 760 and bottom cladding 710 and then selectively etched to remove the portion of NTOC material over the core 760.

Etching is used in microfabrication to chemically remove layers from the surface of a wafer during manufacturing. For many etch steps, part of the wafer is protected from the etchant by a "masking" material which resists etching. In some cases, the masking material is a photoresist which has been patterned using photolithography. Other situations require a more durable mask, such as silicon nitride.

While the middle cladding is SU-8 polymer material, in the present embodiment, any suitable material with negative TOC (NTOC) can be used and is not beyond the scope of the present disclosure. Furthermore, the geometry of the waveguide is not limited to the one shown in FIG. 7, as the following geometries exemplify alternate embodiments of the present disclosure.

Figure 8:
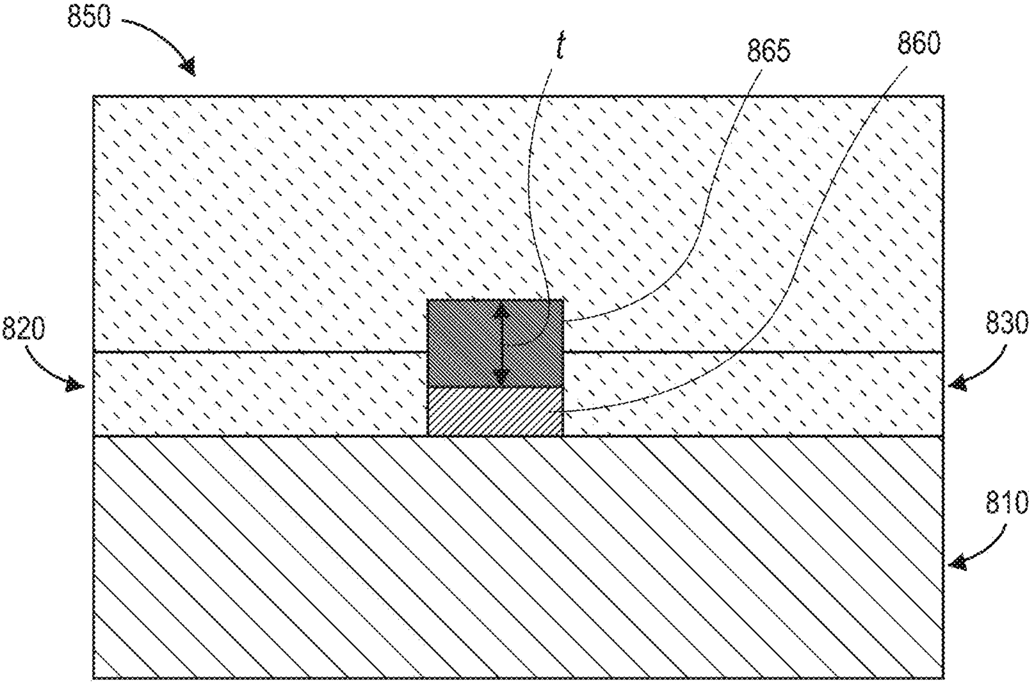
FIG. 8 is a cross-sectional view of a waveguide, according to some embodiments of the present disclosure.

FIG. 8 is a cross-sectional view of a waveguide, according to some embodiments of the present disclosure. Waveguide 800 comprises lower cladding 810, left middle cladding 820, right middle cladding 830, center middle cladding 865, upper cladding 850, and core 860. In the present embodiment, center middle cladding 865 comprises NTOC material and is only above the top of the channel waveguide core 860. The rest of the claddings, lower cladding 810, left middle cladding 820, right middle cladding 830, and upper cladding 850, comprise positive TOC (PTOC) materials. The result is a relatively temperature insensitive waveguide, with its dependence on NTOC thickness.

Figure 9:
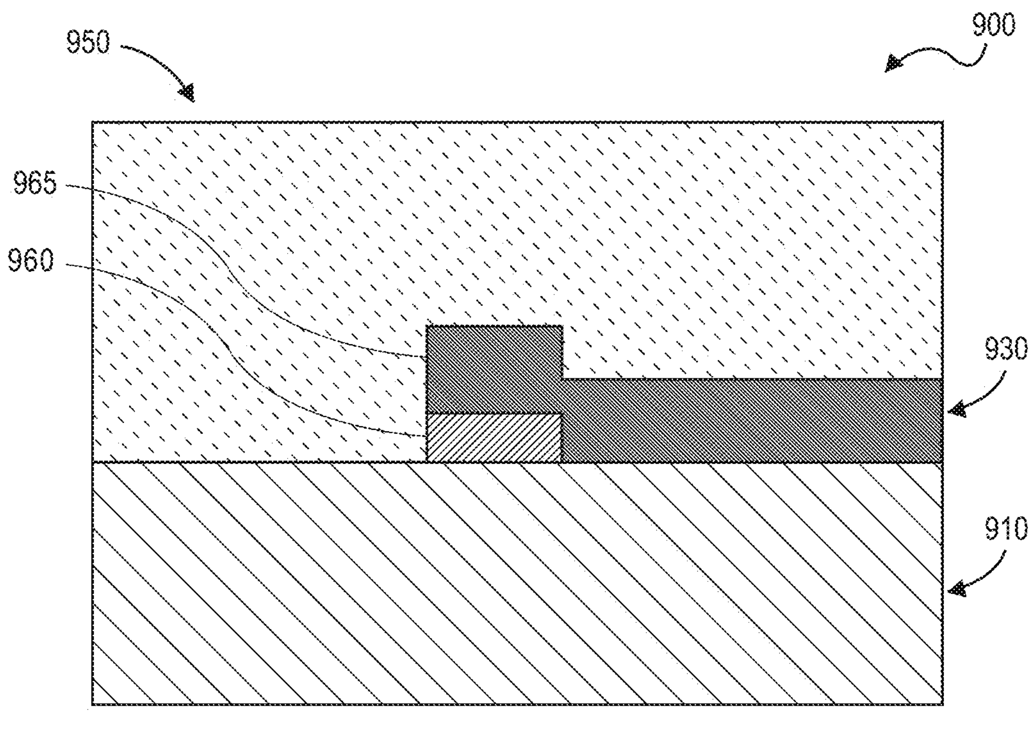
FIG. 9 is a cross-sectional view of a waveguide, according to some embodiments of the present disclosure.

FIG. 9 is a cross-sectional view of a waveguide, according to some embodiments of the present disclosure. Waveguide 900 comprises lower cladding 910, right middle cladding 930, center middle cladding 965, upper cladding 950, and core 960. In the present embodiment, center middle cladding 965 and right middle cladding 930 comprises NTOC material. Lower cladding 910, which is coplanar on one side with right middle cladding 930, and upper cladding 950 comprise PTOC materials. The result is a relatively temperature insensitive waveguide, with its dependence on NTOC thickness.

Figure 10:
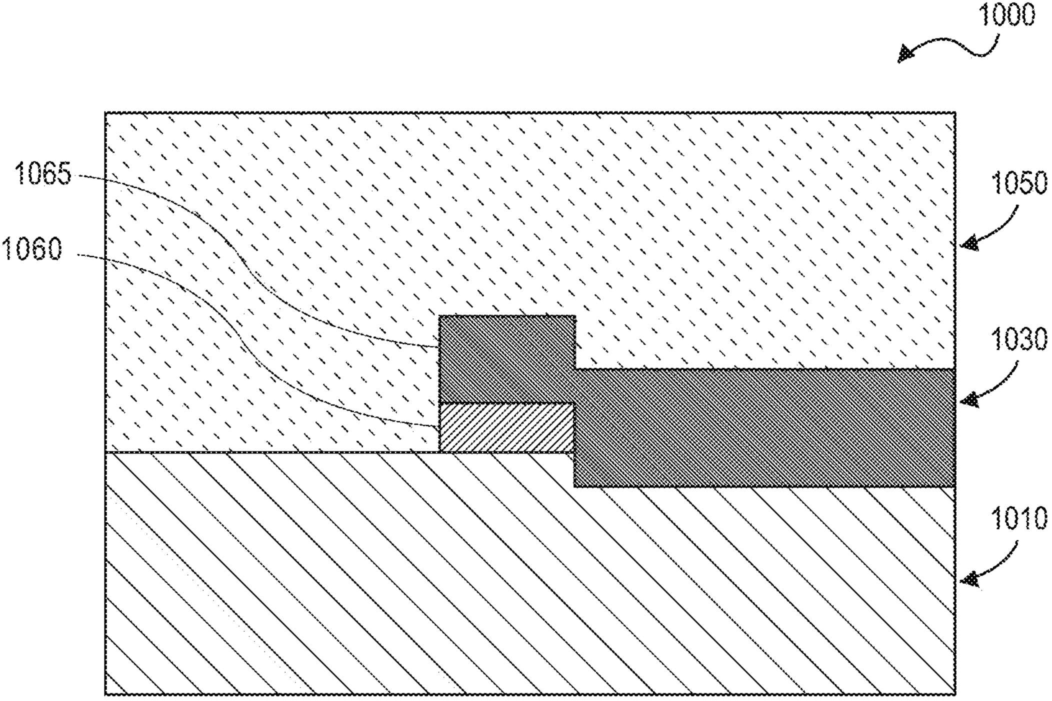
FIG. 10 is a cross-sectional view of a waveguide, according to some embodiments of the present disclosure.

FIG. 10 is a cross-sectional side view of a waveguide, according to some embodiments of the present disclosure. Waveguide 1000 comprises lower cladding 1010, right middle cladding 1030, center middle cladding 1065, upper cladding 1050, and core 1060. In the present embodiment, center middle cladding 1065 and right middle cladding 1030 comprises NTOC material. Lower cladding 1010 and upper cladding 1050 comprise PTOC materials.

Figure 11:
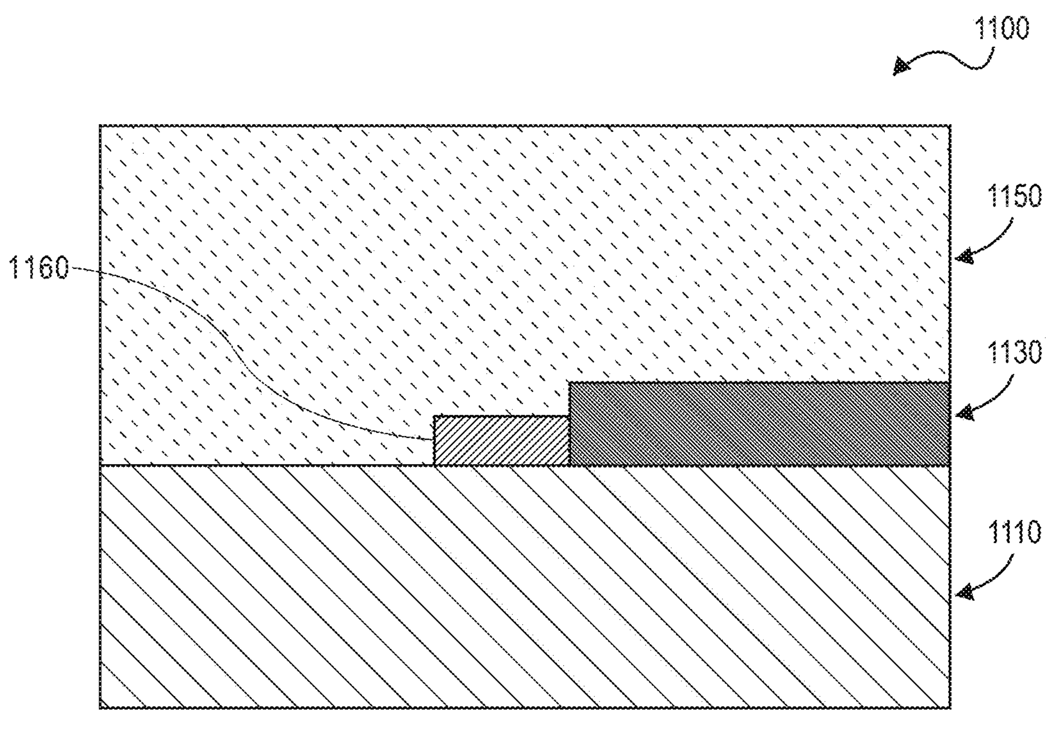
FIG. 11 is a cross-sectional view of a waveguide, according to some embodiments of the present disclosure.

FIG. 11 is a cross-sectional side view of a waveguide, according to some embodiments of the present disclosure. Waveguide 1100 comprises lower cladding 1110, right middle cladding 1130, upper cladding 1050, and core 1060. In the present embodiment, right middle cladding 1030 comprises NTOC material. Lower cladding 1010, which is coplanar on one side with right middle cladding 1030, and upper cladding 1050 are all PTOC materials. The result is a relatively temperature insensitive waveguide, with its dependence on NTOC thickness.

Figure 12:
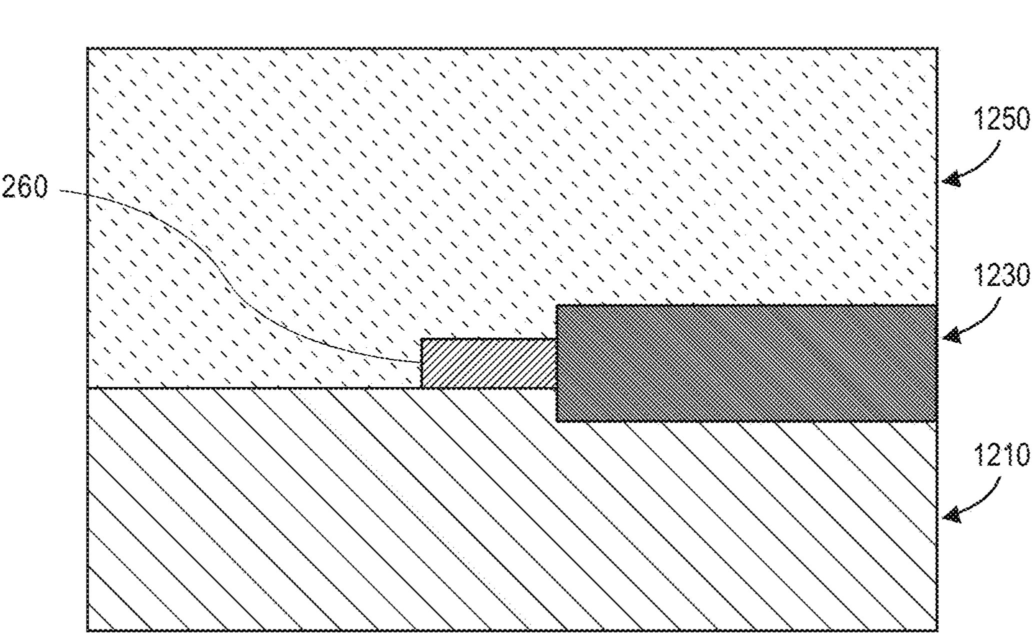
FIG. 12 is a cross-sectional view of a waveguide, according to some embodiments of the present disclosure.

FIG. 12 is a cross-sectional side view of a waveguide, according to some embodiments of the present disclosure. Waveguide 1200 comprises lower cladding 1210, right middle cladding 1230, upper cladding 1250, and core 1260. In the present embodiment, right middle cladding 1230 comprises NTOC material. Lower cladding 1210 and upper cladding 1250 comprise PTOC materials.

Figures 13, 14, 15:
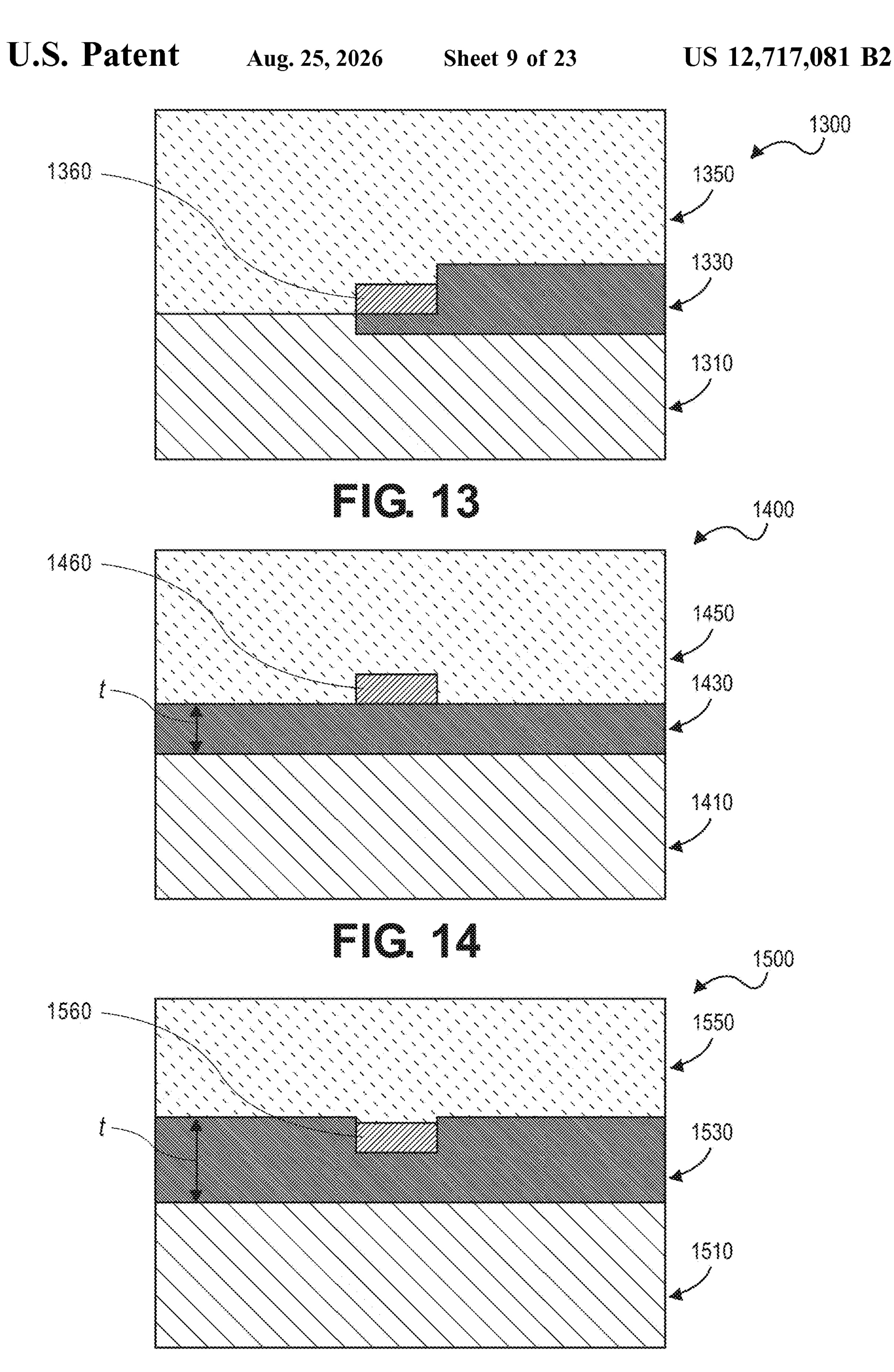
FIG. 13 is a cross-sectional view of a waveguide, according to some embodiments of the present disclosure.
FIG. 14 is a cross-sectional view of a waveguide, according to some embodiments of the present disclosure.
FIG. 15 is a cross-sectional view of a waveguide, according to some embodiments of the present disclosure.

FIG. 13 is a cross-sectional side view of a waveguide, according to some embodiments of the present disclosure. Waveguide 1300 comprises lower cladding 1310, right middle cladding 1330, upper cladding 1350, and core 1360. In the present embodiment, right middle cladding 1330 comprises NTOC material. Lower cladding 1310 and upper cladding 1350 are all PTOC materials. In the present embodiment, right middle cladding 1330 extends underneath the core 1360.

FIG. 14 is a cross-sectional side view of a waveguide, according to some embodiments of the present disclosure. Waveguide 1400 comprises lower cladding 1410, middle cladding 1430, upper cladding 1450, and core 1460. In the present embodiment, middle cladding 1430 is coplanar with lower cladding 1410 and comprises NTOC material. Lower cladding 1410 and upper cladding 1450 comprise PTOC materials.

FIG. 15 is a cross-sectional view of a waveguide, according to some embodiments of the present disclosure. Waveguide 1500 comprises lower cladding 1510, middle cladding 1530, upper cladding 1550, and core 1560. In the present embodiment, middle cladding 1530 comprises NTOC material and coplanar with lower cladding 1510 and extends up on each side of core 1560. Lower cladding 1510 and upper cladding 1550 comprise PTOC materials.

Figures 16, 17, 18:
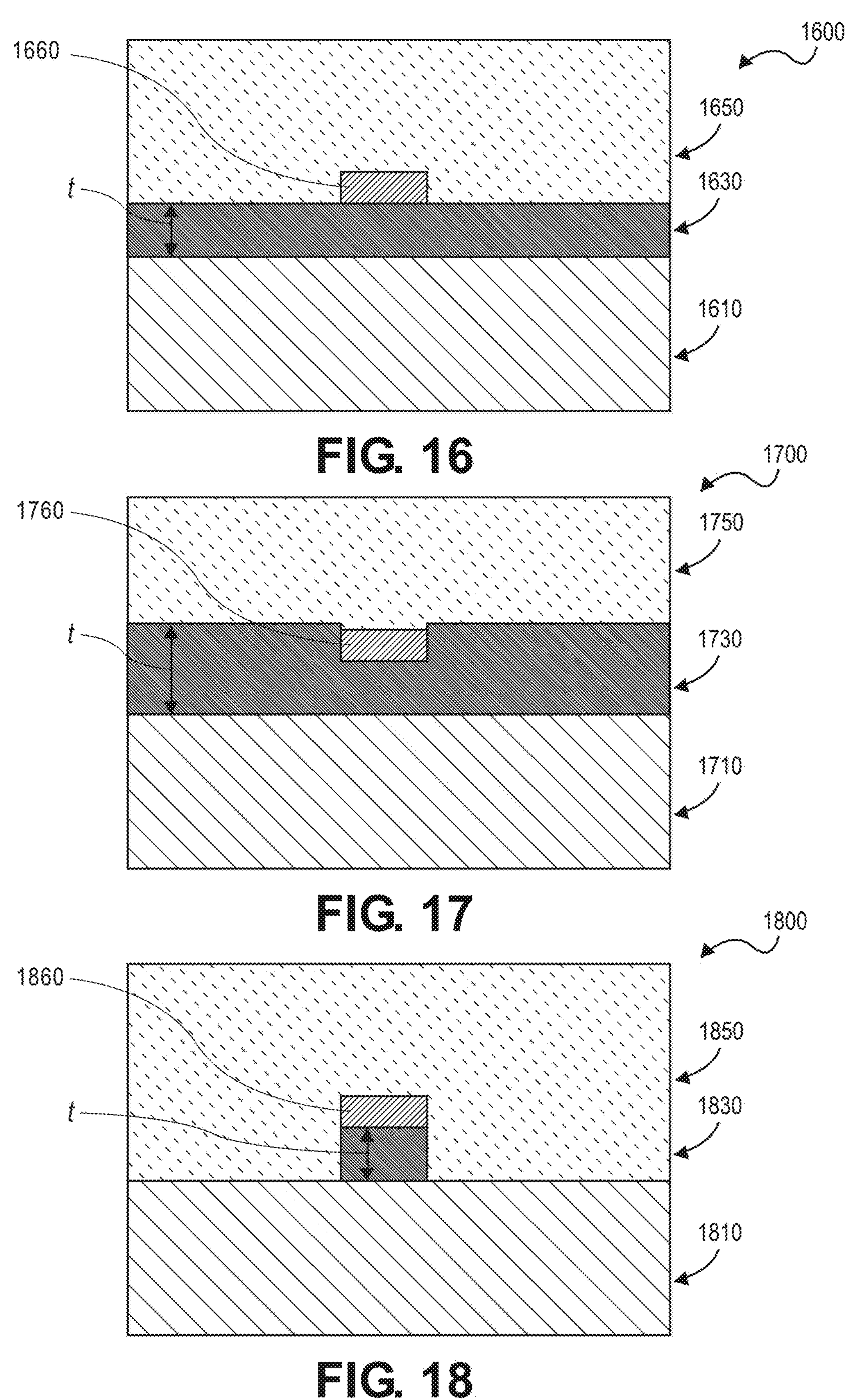
FIG. 16 is a cross-sectional view of a waveguide, according to some embodiments of the present disclosure.
FIG. 17 is a cross-sectional view of a waveguide, according to some embodiments of the present disclosure.
FIG. 18 is a cross-sectional view of a waveguide, according to some embodiments of the present disclosure.

FIG. 16 is a cross-sectional view of a waveguide, according to some embodiments of the present disclosure. Waveguide 1600 comprises lower cladding 1610, middle cladding 1630, upper cladding 1650, and core 1660. In the present embodiment, middle cladding 1630 is coplanar with lower cladding 1610 and comprises NTOC material. Lower cladding 1610 and upper cladding 1650 comprise PTOC materials.

FIG. 17 is a cross-sectional view of a waveguide, according to some embodiments of the present disclosure. Waveguide 1700 comprises lower cladding 1710, middle cladding 1730, upper cladding 1750, and core 1760. In the present embodiment, middle cladding 1730 comprises NTOC material and coplanar with lower cladding 1710 and extends up on each side of core 1760. Lower cladding 1710 and upper cladding 1750 are all PTOC materials.

FIG. 18 is a cross-sectional view of a waveguide, according to some embodiments of the present disclosure. Waveguide 1800 comprises lower cladding 1810, middle cladding 1865, upper cladding 1850, and core 1860. In the present embodiment, middle cladding 1865 comprises NTOC materials. Lower cladding 1810 and upper cladding 1850 are coplanar and comprise PTOC materials.

Figures 19, 20, 21:
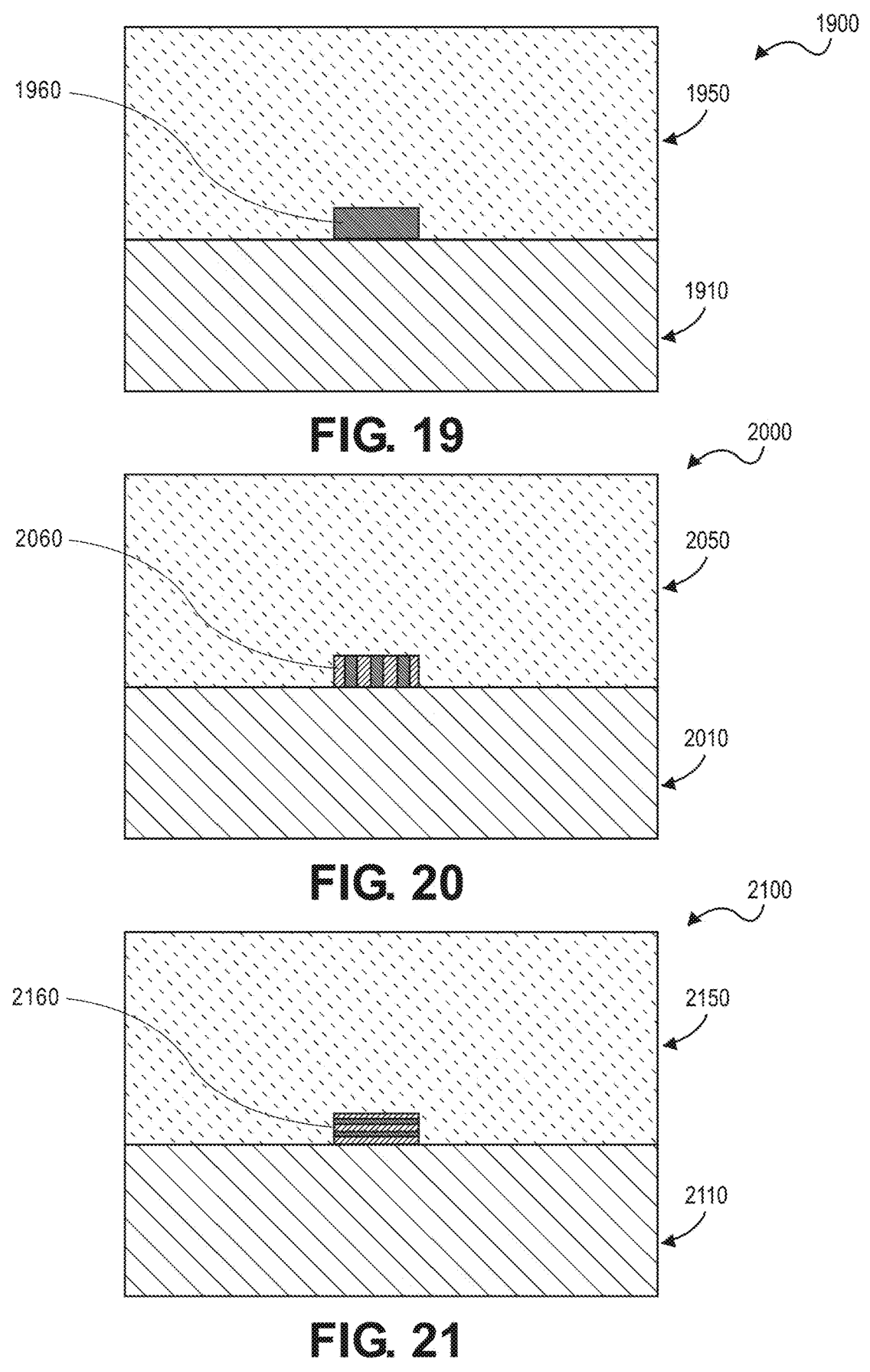

FIG. 19 is a cross-sectional view of a waveguide, according to some embodiments of the present disclosure. Waveguide 1900 comprises lower cladding 1910, upper cladding 1950, and core 1960. In the present embodiment, core 1960 comprises NTOC material. Lower cladding 1910 and upper cladding 1950 are coplanar comprise PTOC materials.

FIG. 20 is a cross-sectional view of a waveguide, according to some embodiments of the present disclosure. Waveguide 2000 comprises lower cladding 2010, upper cladding 2050, and core 2060. In the present embodiment, core 2060 comprises interleavings in the vertical direction (i.e., normal the plane of the lower cladding) of NTOC and PTOC materials. While the present embodiment has 7 layers, any plurality of layers is not beyond the scope of the present disclosure. Lower cladding 2010 and upper cladding 2050 are coplanar comprise PTOC materials.

FIG. 21 is a cross-sectional view of a waveguide, according to some embodiments of the present disclosure. Waveguide 2100 comprises lower cladding 2110, upper cladding 2150, and core 2160. In the present embodiment, core 2160 comprises interleavings in the horizontal direction (i.e., parallel to the plane of the lower cladding) of NTOC and PTOC materials. While the present embodiment has 5 layers, any plurality of layers is not beyond the scope of the present disclosure. Lower cladding 2110 and upper cladding 2150 are coplanar comprise PTOC materials.

Figures 22, 23, 24:
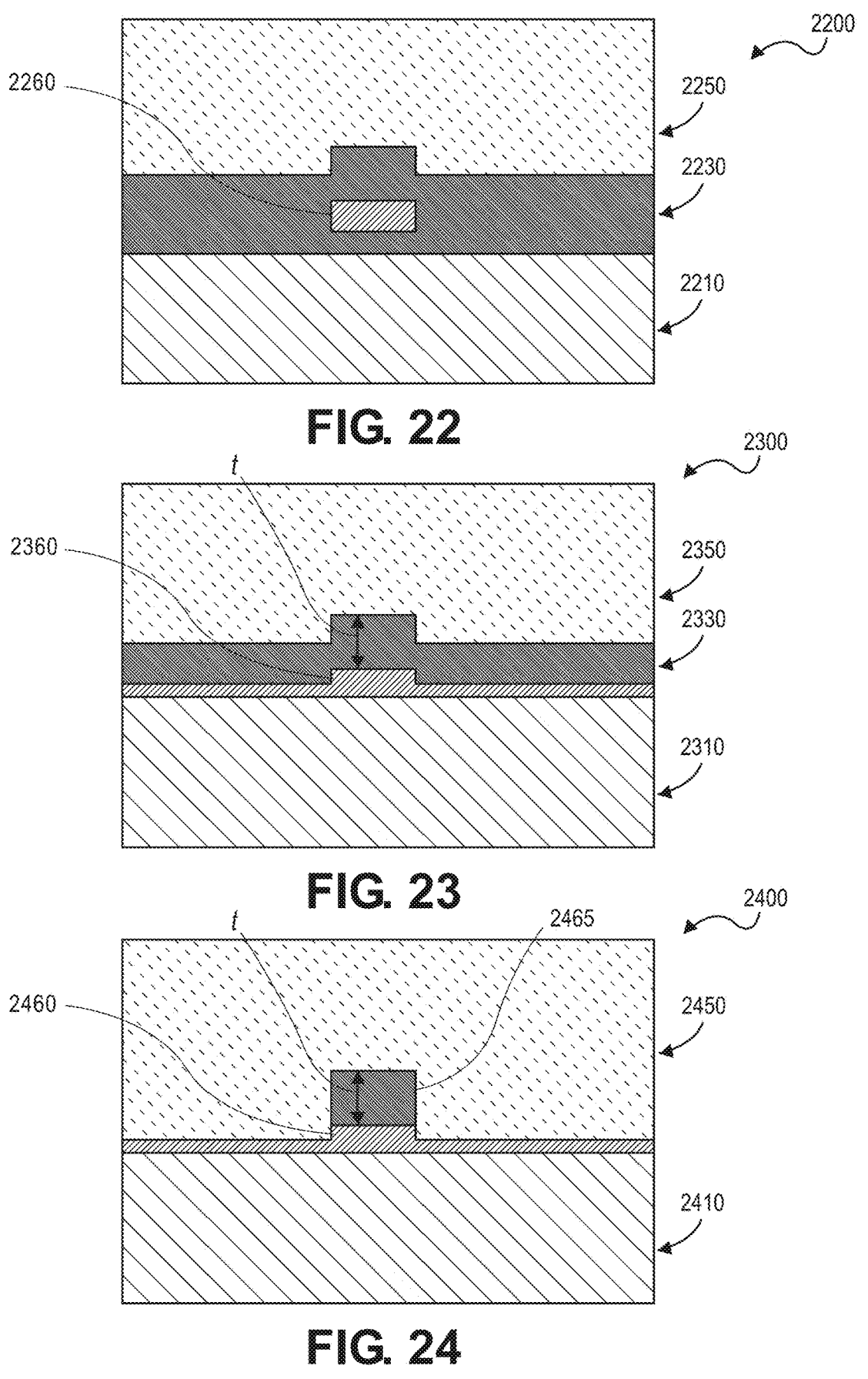

FIG. 22 is a cross-sectional view of a waveguide, according to some embodiments of the present disclosure. Waveguide 2200 comprises lower cladding 2210, upper cladding 2250, middle cladding 2230 and core 2260. Middle cladding 2230 two-dimensionally surrounds the core 2260 and comprises NTOC material. Lower cladding 2210 and upper cladding 2250 comprise PTOC materials.

FIG. 23 is a cross-sectional view of a waveguide, according to some embodiments of the present disclosure. Waveguide 2300 comprises lower cladding 2310, upper cladding 2350, middle cladding 2330, and core 2360. In the present embodiment, both core 2360 and middle cladding 2330 extend the width of the waveguide. Middle cladding 2330 comprises NTOC material. Lower cladding 2310 and upper cladding 2350 comprise PTOC materials.

FIG. 24 is a cross-sectional view of a waveguide, according to some embodiments of the present disclosure. Waveguide 2400 comprises lower cladding 2410, upper cladding 2450, middle cladding 2465, and core 2460. Middle cladding 2465 comprises NTOC material, while the core 2460 extends the width of the guide. Lower cladding 2410 and upper cladding 2450 comprise PTOC materials.

Figure 25:
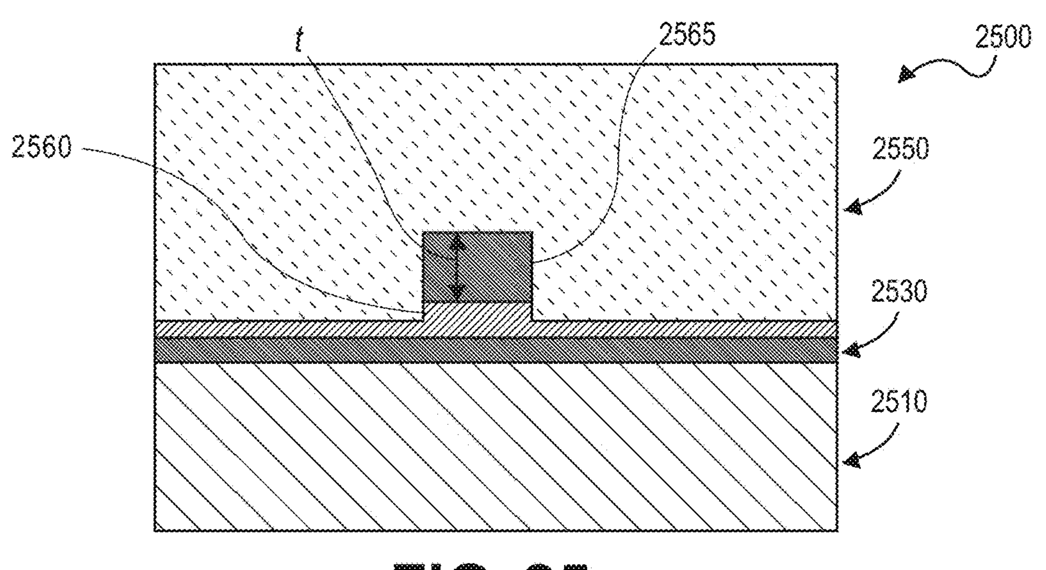
FIG. 25 is a cross-sectional view of a waveguide, according to some embodiments of the present disclosure.

FIG. 25 is a cross-sectional view of a waveguide, according to some embodiments of the present disclosure. Waveguide 2500 comprises lower cladding 2510, upper cladding 2550, middle cladding 2530, middle cladding 2565, and core 2560. In the present embodiment, both core 2560 and middle cladding 2530 extend the width of the waveguide. Middle cladding 2530 and middle cladding 2565 comprise NTOC material. Lower cladding 2310 and upper cladding 2350 comprise PTOC materials.

Figure 26:
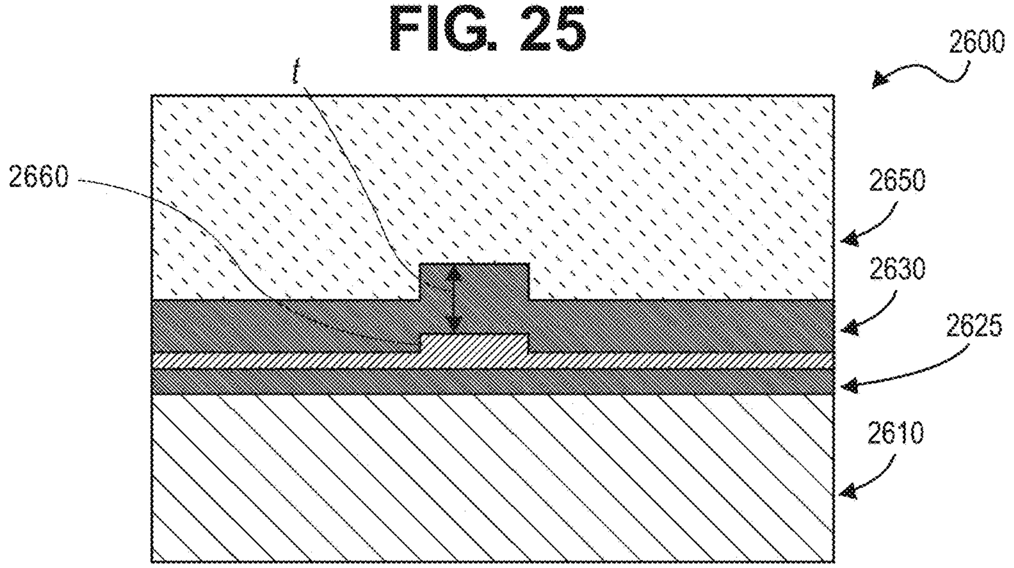
FIG. 26 is a cross-sectional view of a waveguide, according to some embodiments of the present disclosure.

FIG. 26 is a cross-sectional view of a waveguide, according to some embodiments of the present disclosure. Waveguide 2600 comprises lower cladding 2610, upper cladding 2650, middle cladding 2630, middle cladding 2665, and core 2660. In the present embodiment, core 2660, middle cladding 2625, and middle cladding 2630 extend the width of the waveguide. Middle cladding 2530 and middle cladding 2625 comprise NTOC material. Lower cladding 2610 and upper cladding 2650 comprise PTOC materials.

Figure 27:
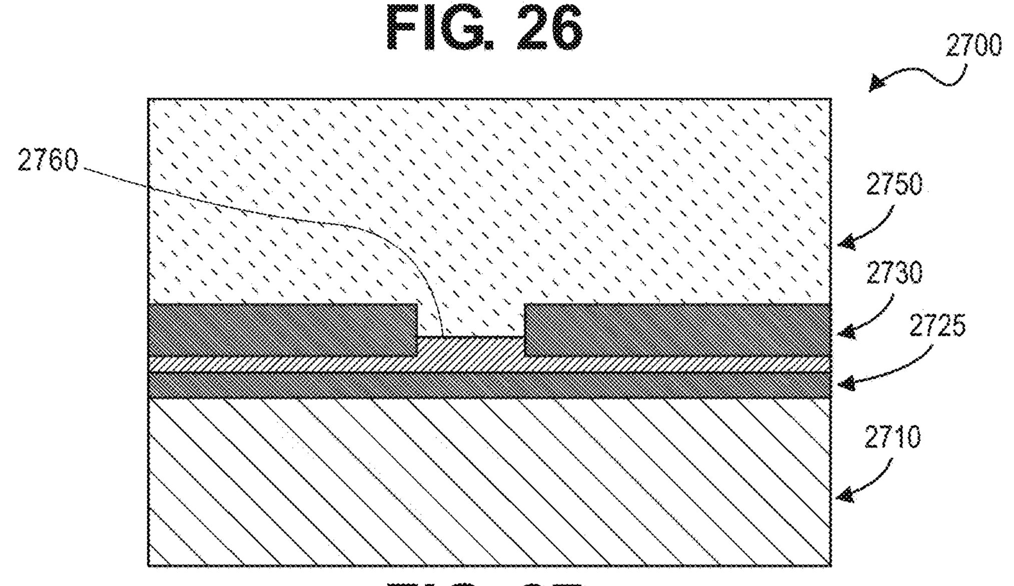
FIG. 27 is a cross-sectional view of a waveguide, according to some embodiments of the present disclosure.

FIG. 27 is a cross-sectional view of a waveguide, according to some embodiments of the present disclosure. Waveguide 2700 comprises lower cladding 2710, upper cladding 2750, middle cladding 2730, middle cladding 2725, and core 2760. In the present embodiment, both core 2760 and middle cladding 2725 extend the width of the waveguide. Middle cladding 2730 and middle cladding 2725 comprise NTOC material. Lower cladding 2710 and upper cladding 2750 comprise PTOC materials.

Figure 28:
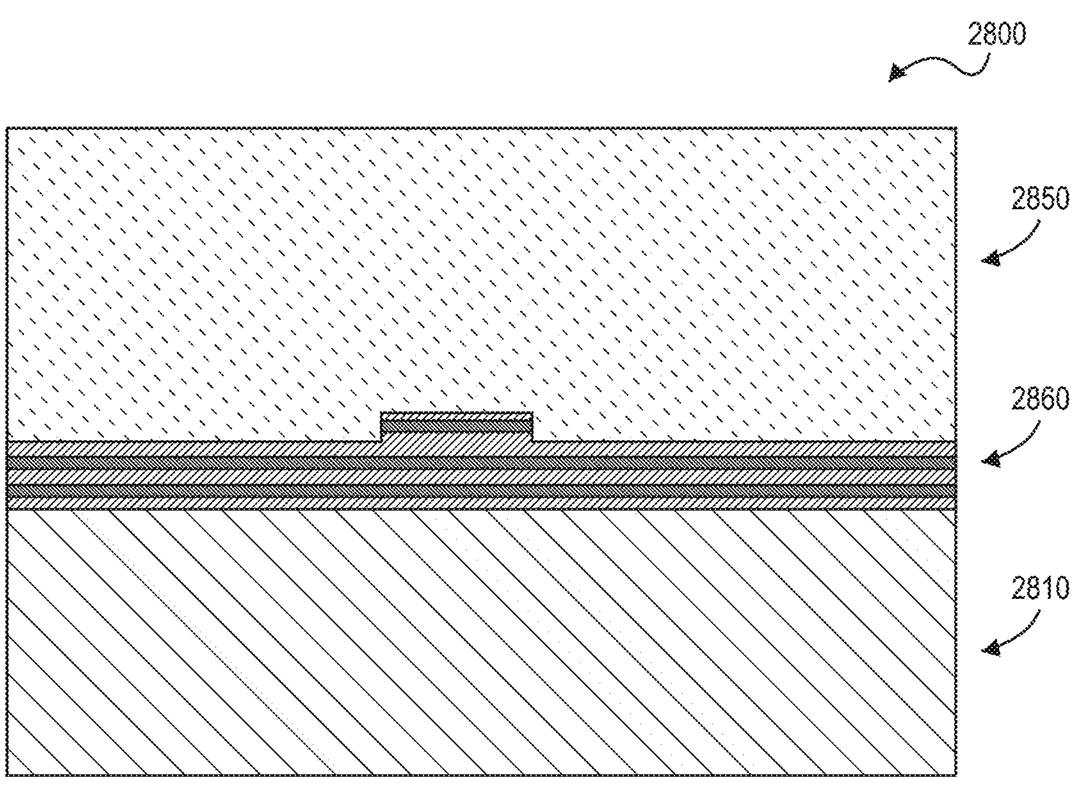
FIG. 28 is a cross-sectional view of a waveguide, according to some embodiments of the present disclosure.

FIG. 28 is a cross-sectional view of a waveguide, according to some embodiments of the present disclosure. The rib waveguide core extends the width of the waveguide and can be horizontally segmented into NTOC material and the usual positive TOC material. Waveguide 2800 comprises lower cladding 2810, upper cladding 2850, and core 2860. In the present embodiment, core 2860 comprises interleavings in the horizontal direction (i.e., parallel to the plane of the lower cladding) of NTOC and PTOC materials. While the present embodiment has 7 layers, any plurality of layers is not beyond the scope of the present disclosure. Lower cladding 2810 and upper cladding 2850 are coplanar comprise PTOC materials.

Sub-Wavelength Grating (SWG)

In an alternate approach from the waveguide with fixed cross-section structure is the waveguide that employs sub-wavelength grating along its length, for short "SWG," to be used as array waveguide in an AWG. These structures behave as continuous materials if the period of the grating is smaller than the wavelength of light in vacuum divided of the higher material index of the two used for the grading. In our case one material is the usual positive TOC material and the other is NTOC material. The equivalent material index (neq) of such meta-material structure is given by the formulae below for TE (parallel) and TM (normal) polarizations of the guided light:

$$n_{eq} = \begin{cases} \sqrt{fn_1^2 + (1-f)n_2^2}, & \text{parallel} \\ \dfrac{1}{f\dfrac{1}{n_1^2} + (1-f)\dfrac{1}{n_2^2}}, & \text{normal} \end{cases}$$

Here, $n_1$ and $n_z$ are the refractive indices of the two materials and f is the volume fraction of material $n_1$ within one period. NTOC material can be either $n_1$ or $n_2$. The period is designed in such way to give $n_{eq}$ with minimized or zero TOC which in turn gives the modal effective index with minimal or zero TOC and hence the AWG insensitive or minimally sensitive to the environment temperature changes. This is now described in association with the following structures, for both channel and rib waveguide geometries.

Figure 29:
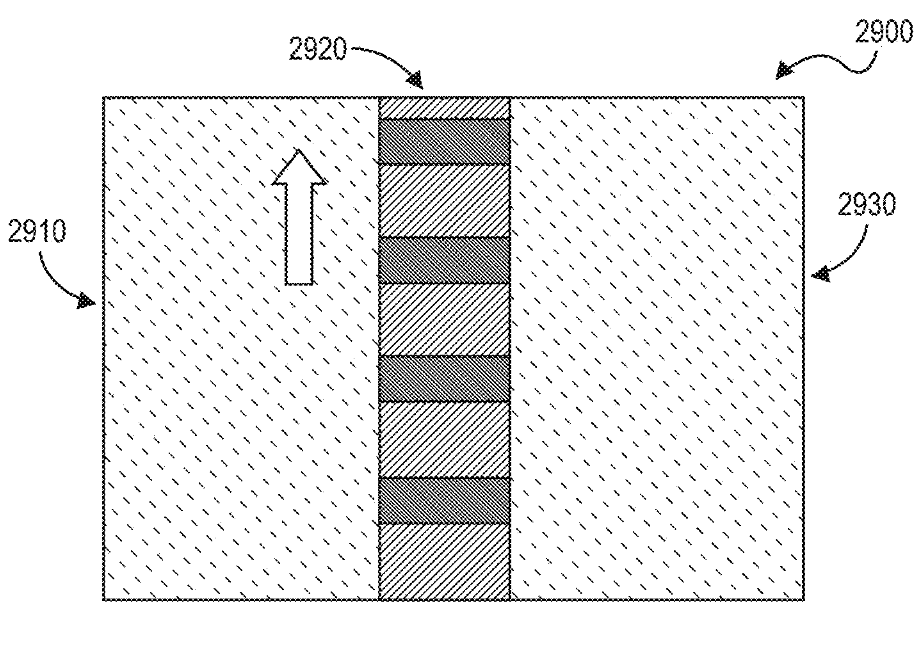
FIG. 29 is a cross-sectional top view of a waveguide, according to some embodiments of the present disclosure.
Figure 34:
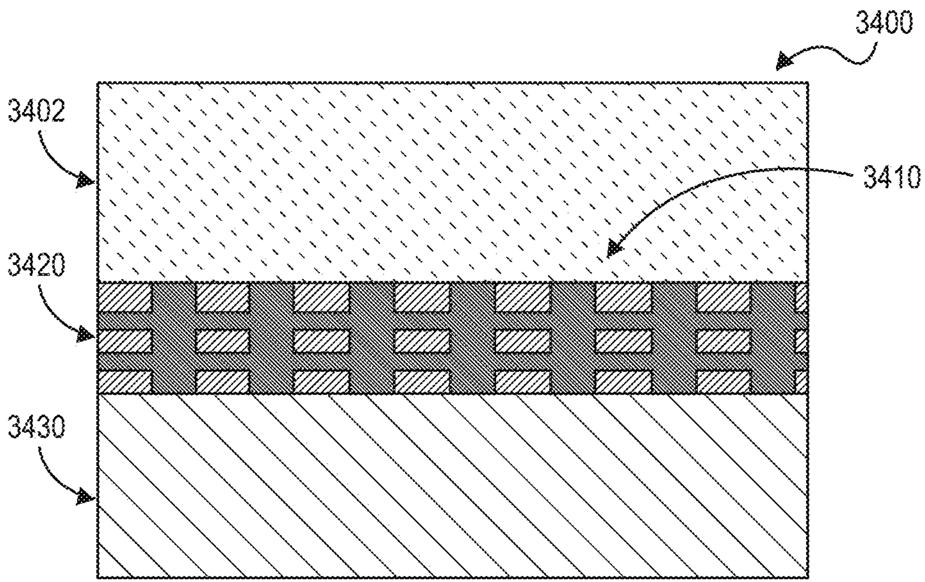
FIG. 34 is a cross-sectional side view of a waveguide, according to some embodiments of the present disclosure.

FIG. 29 is a cross-sectional top view of a waveguide, according to some embodiments of the present disclosure. Waveguide 2900 comprises left cladding 2910, right cladding 2930, core 2920. FIG. 29 is a top view of the (rib or channel) waveguide core 2920, where the arrow indicates direction of light propagation. The core 2920 material is longitudinally segmented into SWG with NTOC material. The corresponding sideview cross-section is as shown in FIG. 34.

Figure 30:
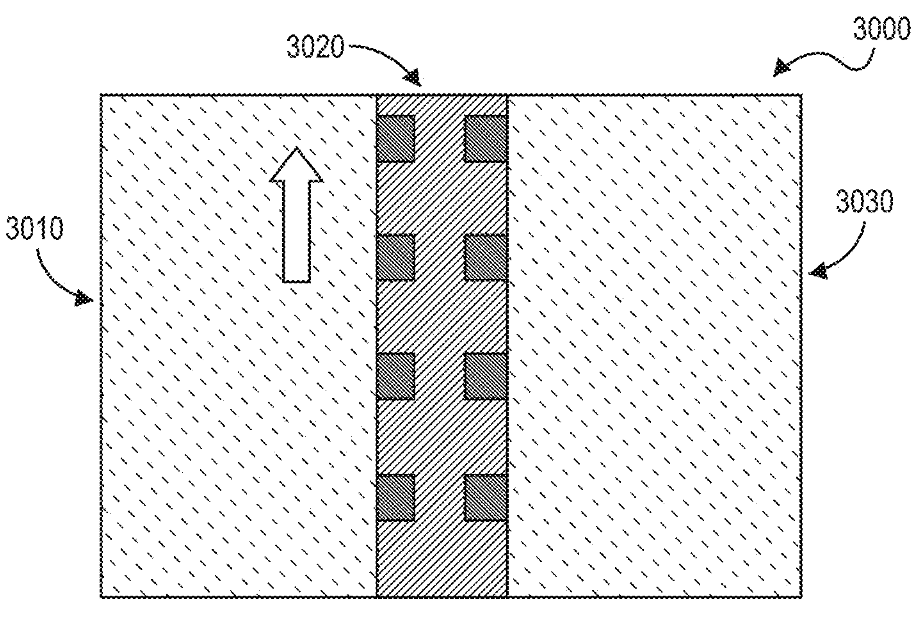
FIG. 30 is a cross-sectional top view of a waveguide, according to some embodiments of the present disclosure.

FIG. 30 is a cross-sectional top view of a waveguide, according to some embodiments of the present disclosure. Waveguide 3000 comprises left cladding 3010, right cladding 3030, and core 3020. FIG. 30 is a top view of the (rib or channel) waveguide core 3020, where the arrow indicates direction of light propagation. The waveguide core material is longitudinally segmented into SWG where NTOC material is not fully covering the entire width of the waveguide. The corresponding sideview cross-section is as shown in FIG. 34.

Figure 31:
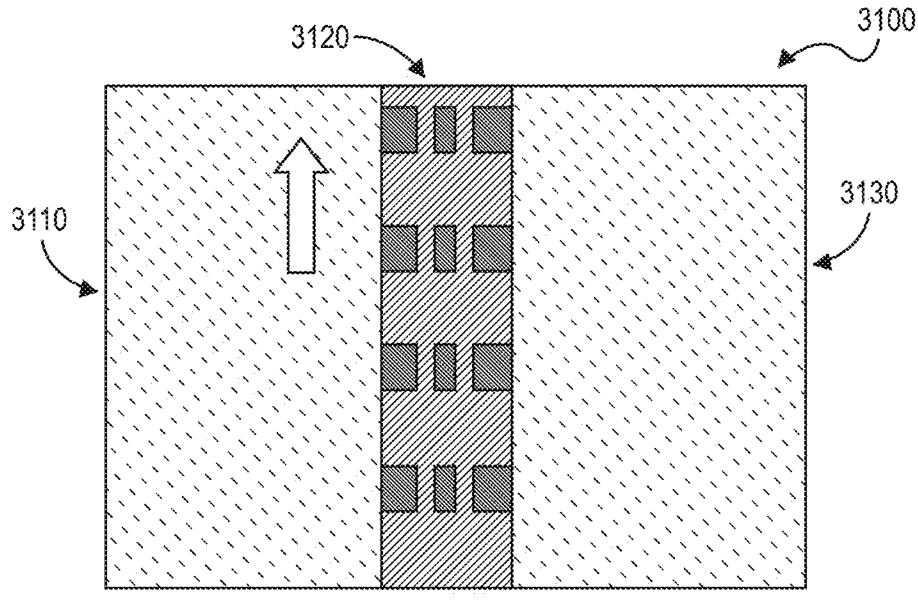
FIG. 31 is a cross-sectional top view of a waveguide, according to some embodiments of the present disclosure.

FIG. 31 is a cross-sectional top view of a waveguide, according to some embodiments of the present disclosure. Waveguide 3100 comprises left cladding 3110, right cladding 3130, and core 3120. FIG. 31 is a top view of the (rib or channel) waveguide core 3120, where the arrow indicates direction of light propagation. The waveguide core material is longitudinally segmented into SWG where NTOC material is not fully covering the entire width of the waveguide but has two breaking points, however any number of breaking points is not beyond the scope of the present disclosure. The corresponding sideview details are shown in FIG. 34.

Figure 32:
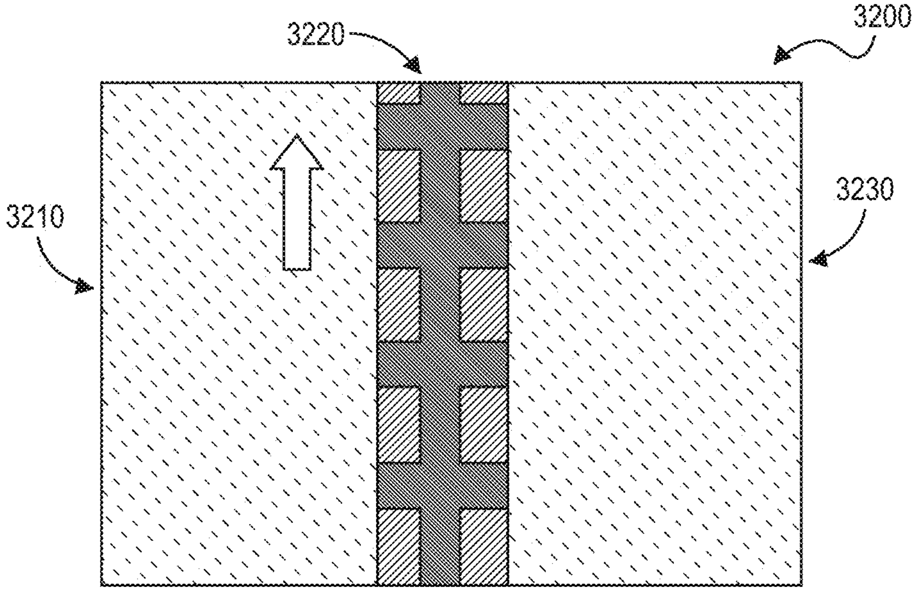
FIG. 32 is a cross-sectional top view of a waveguide, according to some embodiments of the present disclosure.

FIG. 32 is a cross-sectional top view of a waveguide, according to some embodiments of the present disclosure. Waveguide 3200 comprises left cladding 3210, right cladding 3230, and core 3220. FIG. 32 is a top view of the (rib or channel) waveguide core 3220, where the arrow indicates direction of light propagation. The waveguide core material is longitudinally segmented into SWG where PTOC material is not fully covering the entire width of the waveguide. The corresponding sideview details are shown in FIG. 34.

Figure 33:
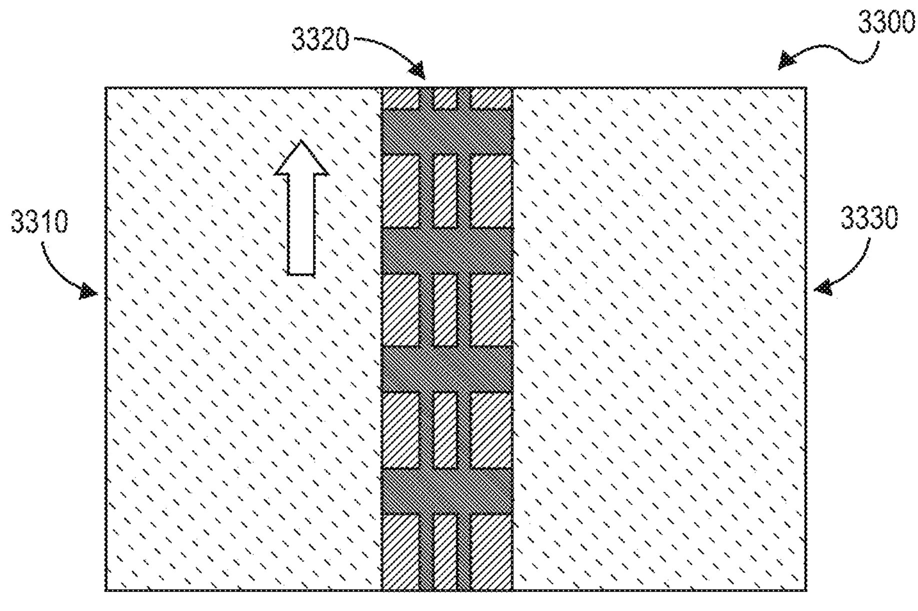
FIG. 33 is a cross-sectional top view of a waveguide, according to some embodiments of the present disclosure.

FIG. 33 is a cross-sectional top view of a waveguide, according to some embodiments of the present disclosure. Waveguide 3300 comprises left cladding 3310, right cladding 3330, and core 3320. FIG. 33 is a top view of the (rib or channel) waveguide core 3320, where the arrow indicates direction of light propagation. The waveguide core material is longitudinally segmented into SWG where PTOC material is not fully covering the entire width of the waveguide and has two breaking points, however any number of breaking points is not beyond the scope of the present disclosure. The corresponding sideview details are shown in FIG. 34

FIG. 34 is a cross-sectional sideview of a waveguide, according to some embodiments of the present disclosure. Waveguide 3400 comprises top cladding 3402, lower cladding 3430, and core 3410. FIG. 34 is a sideview of the (rib or channel) waveguide cores shown in FIGS. 29-33, with the arrow indicating direction of light propagation. Core 3410 comprises two horizontal layers of NTOC material interspersed with PTOC blocks 3420, however any number of layers is not beyond the scope of the present disclosure.

Additional Compensated Waveguides Configurations

Figure 35:
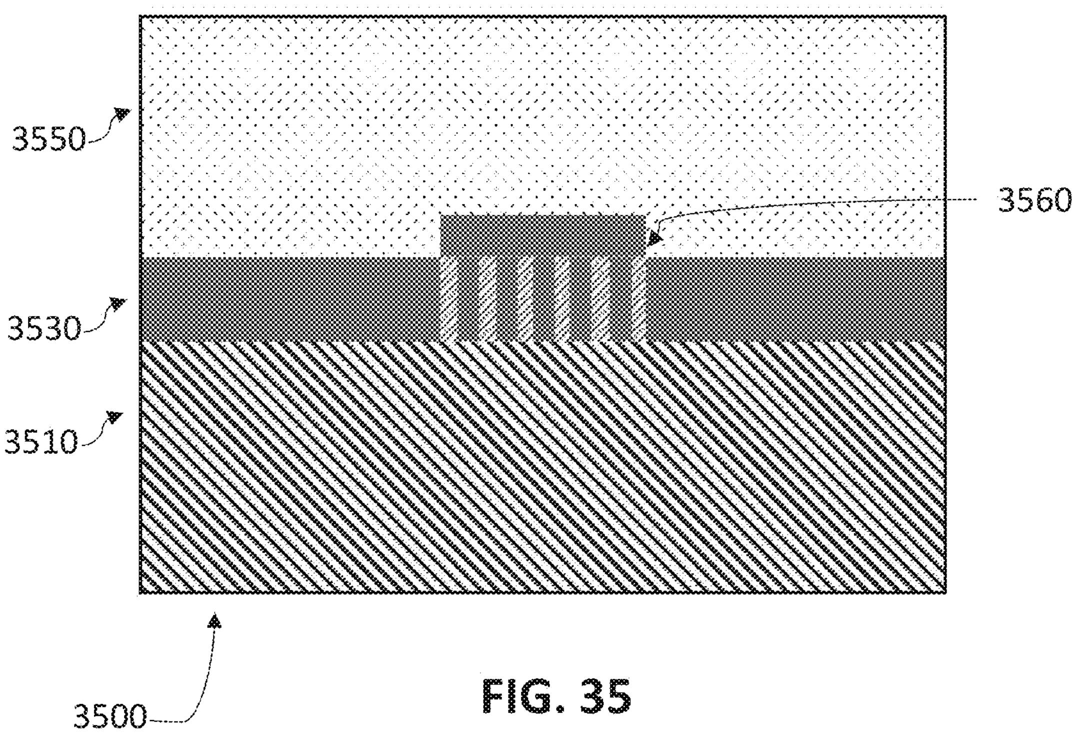
FIG. 35 is a cross-sectional view of a waveguide, according to some embodiments of the present disclosure.

FIG. 35 is a cross-sectional view of a waveguide, according to some embodiments of the present disclosure. Waveguide 3500 comprises core 3560, lower cladding 3510, upper cladding 3550, and middle cladding 3530. In the present embodiment, both core 3560 and middle cladding 3530 are interleaved having a cap of middle cladding material 3530. Middle cladding 3530 comprises NTOC material. Lower cladding 3510 and upper cladding 3550 comprise PTOC materials.

Figure 36:
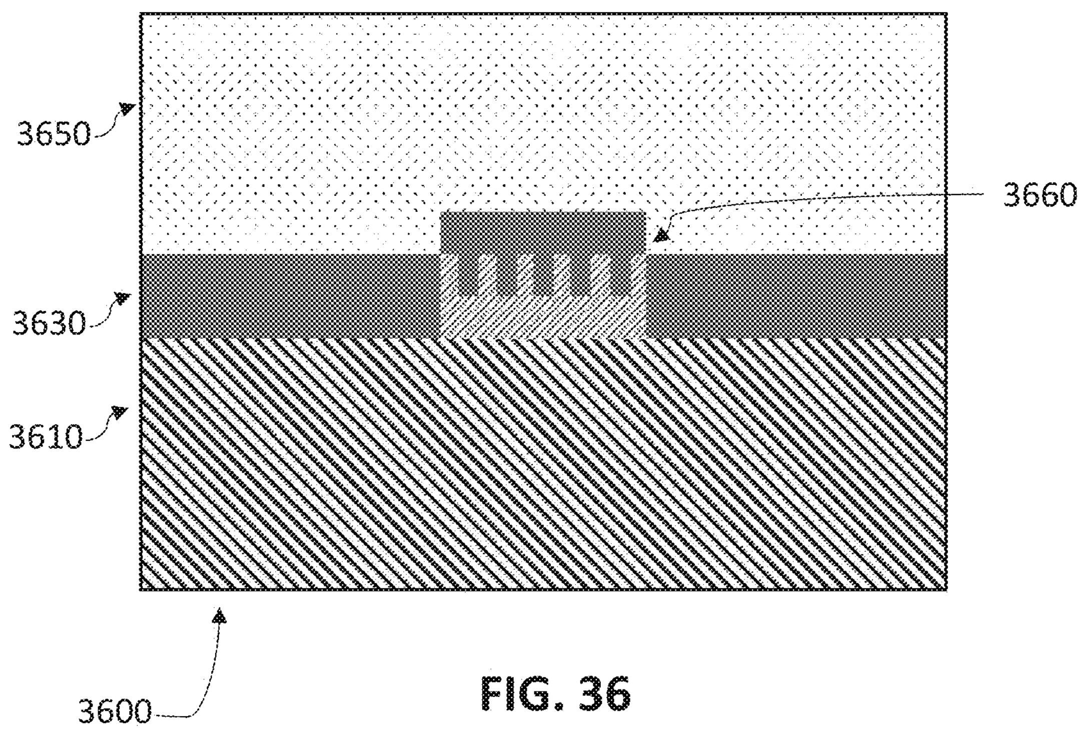
FIG. 36 is a cross-sectional view of a waveguide, according to some embodiments of the present disclosure.

FIG. 36 is a cross-sectional view of a waveguide, according to some embodiments of the present disclosure. Waveguide 3600 comprises core 3660, lower cladding 3610, upper cladding 3650, and middle cladding 3630. In the present embodiment, middle cladding 3630 is partially interleaved with core 3660 also having a cap covering the combination of middle cladding material 3630. Middle cladding 3630 comprises NTOC material. Lower cladding 3610 and upper cladding 3650 comprise PTOC materials.

Figure 37:
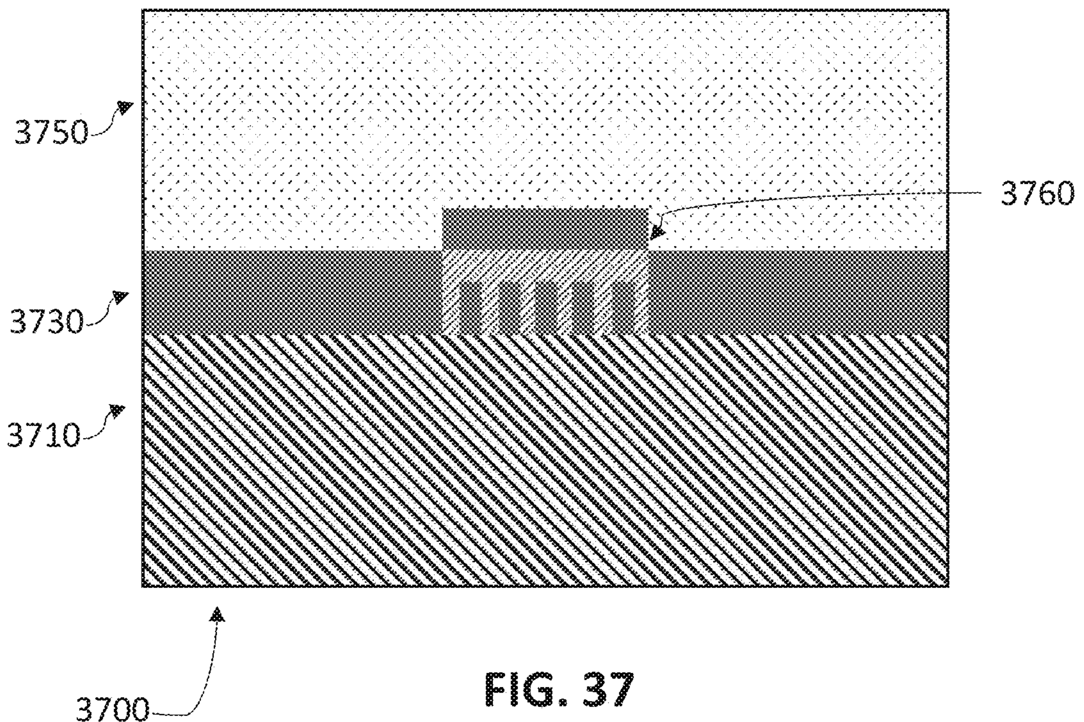
FIG. 37 is a cross-sectional view of a waveguide, according to some embodiments of the present disclosure.

FIG. 37 is a cross-sectional view of a waveguide, according to some embodiments of the present disclosure. Waveguide 3700 comprises core 3760, lower cladding 3710, upper cladding 3750, and middle cladding 3730. In the present embodiment, middle cladding 3730 is partially interleaved with core 3760 also having a cap covering the combination of middle cladding material 3730. Middle cladding 3730 comprises NTOC material. Lower cladding 3710 and upper cladding 3750 comprise PTOC materials.

Figure 38:
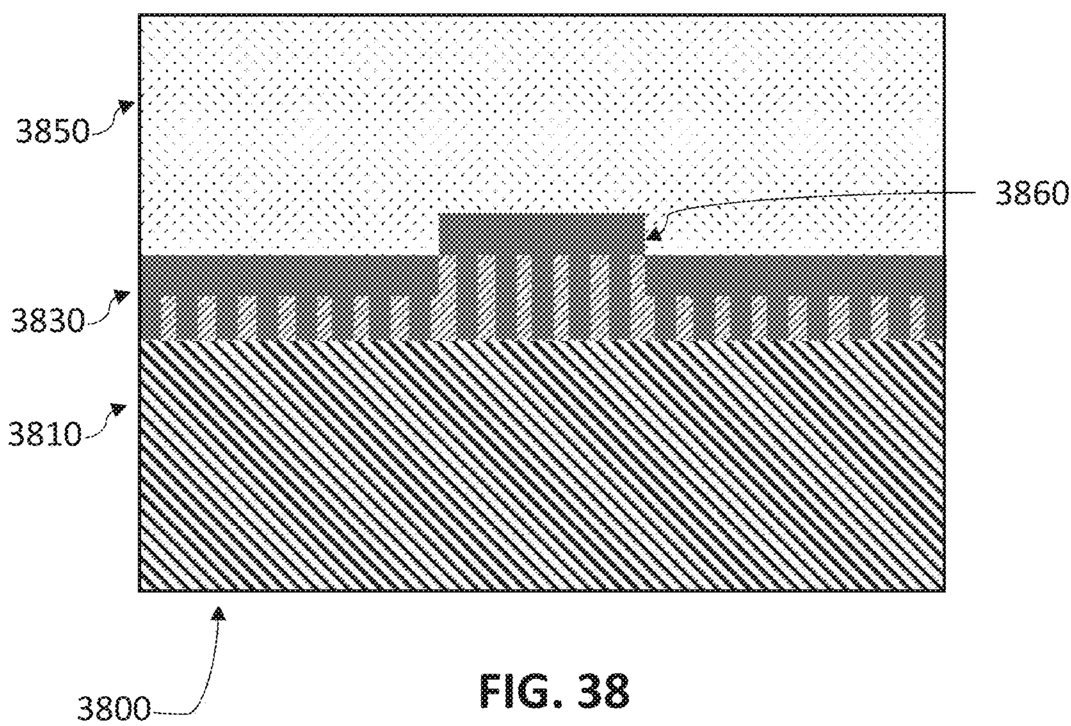
FIG. 38 is a cross-sectional view of a waveguide, according to some embodiments of the present disclosure.

FIG. 38 is a cross-sectional view of a waveguide, according to some embodiments of the present disclosure. Waveguide 3800 comprises core 3860, lower cladding 3810, upper cladding 3850, and middle cladding 3830. In the present embodiment, middle cladding 3830 is interleaved with core 3860 extending the entire width of the device and also having a cap covering the combination of middle cladding material 3830. Middle cladding 3830 comprises NTOC material. Lower cladding 3810 and upper cladding 3850 comprise PTOC materials.

Figure 39:
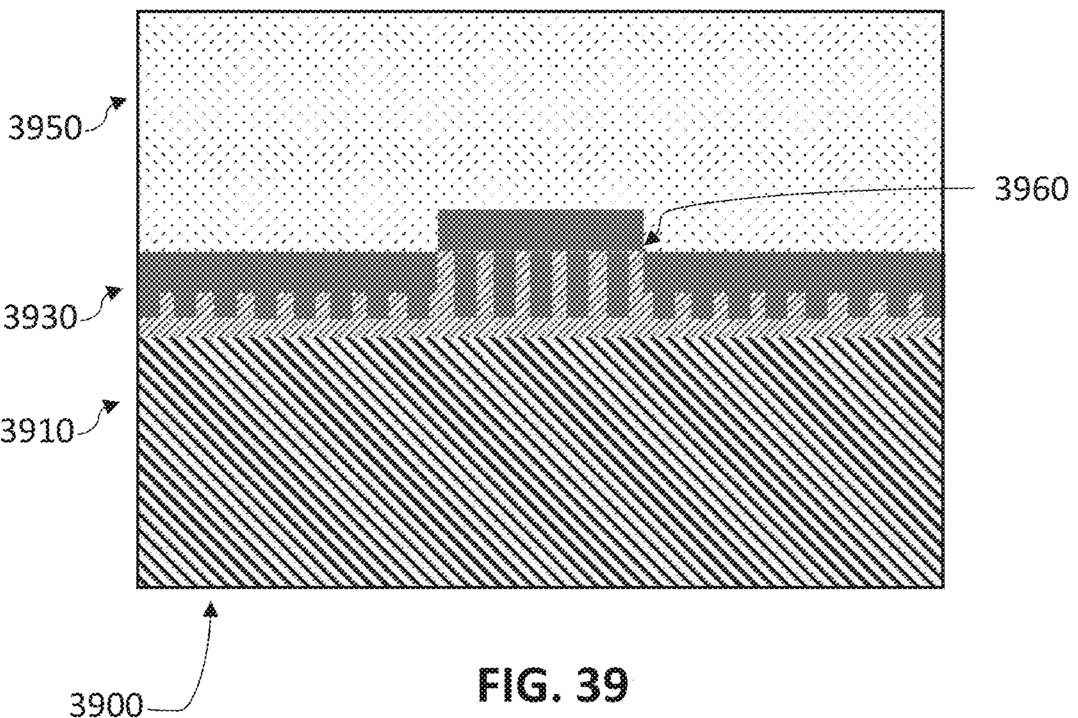
FIG. 39 is a cross-sectional view of a waveguide, according to some embodiments of the present disclosure.

FIG. 39 is a cross-sectional view of a waveguide, according to some embodiments of the present disclosure. Waveguide 3900 comprises core 3960, lower cladding 3910, upper cladding 3950, and middle cladding 3930. In the present embodiment, middle cladding 3930 is partially interleaved with core 3960 extending the entire width of the device and also having a cap covering the combination of middle cladding material 3930. Middle cladding 3930 comprises NTOC material. Lower cladding 3910 and upper cladding 3950 comprise PTOC materials.

Figure 40:
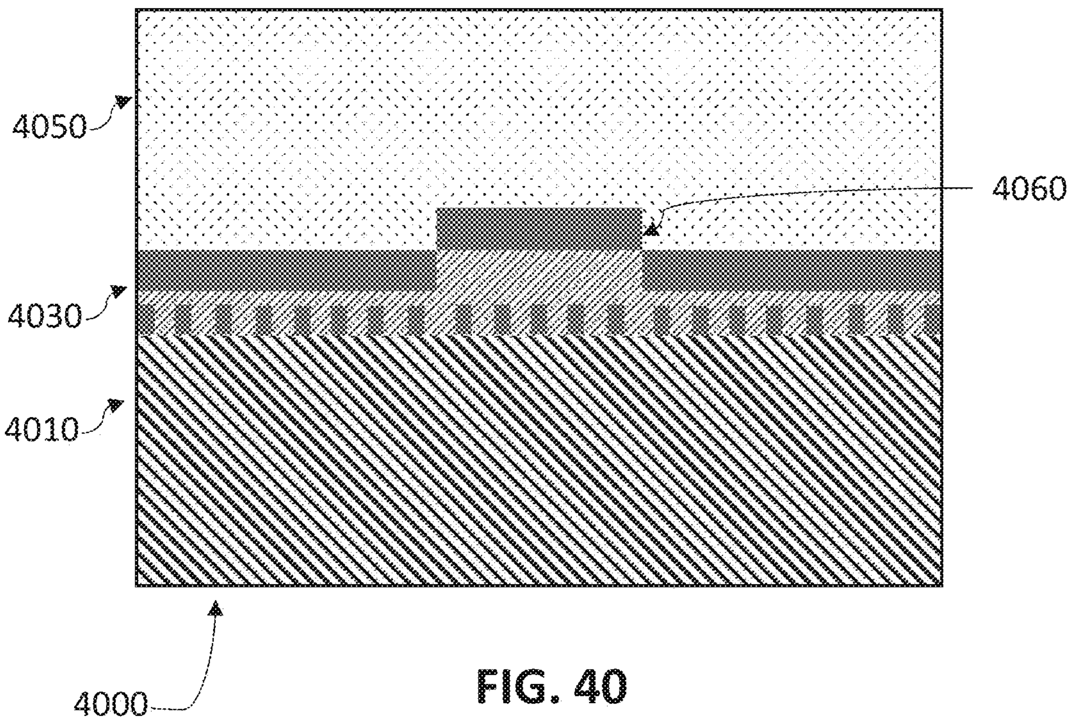
FIG. 40 is a cross-sectional view of a waveguide, according to some embodiments of the present disclosure.

FIG. 40 is a cross-sectional view of a waveguide, according to some embodiments of the present disclosure. Waveguide 4000 comprises core 4060, lower cladding 4010, upper cladding 4050, and middle cladding 4030. In the present embodiment, middle cladding 4030 is partially interleaved with core 4060 extending the entire width of the device and also having a cap covering the combination of middle cladding material 4030. Middle cladding 4030 comprises NTOC material. Lower cladding 4010 and upper cladding 4050 comprise PTOC materials.

While many figures roughly depict interleavings of equal thickness, layers of varying thickness are within the scope of the present disclosure. This can be accomplished by having one material having a first thickness and a second material having a second thickness. Furthermore, interleaving layers can vary as a function of placement, e.g., thinner or thicker layers disposed radially/linearly from the center of the core. In other words, thicknesses of these layers do not have to be equal but can be any suitable value for each layer which is different from any other layer.

General shaped waveguide cores and mid claddings with one and/or the other can contain NTOC or mix of NTOC and PTOC materials are within the scope of the present disclosure. Additionally, the inventors of the present disclosure proclaim than an alloy of NTOC and PTOC materials yielding material with zero or close to zero TOC within their perceived scope. Such alloys with high and low refractive index are to be used for core and cladding of waveguide, respectively. Alloys can be used for core and/or cladding. All the above-described waveguide structures can be integrated into any integrated device like AWG, and any PIC, resulting in temperature-independent device and PICs.

In some embodiments, a multiplexer or demultiplexer may optionally be fabricated into the waveguide assembly. For example, the mux/demux may be implemented as a diffraction grating, such as an etched Echelle grating. In other examples, the mux/demux may be implemented as an AWG demultiplexer, a thin-film-filter (TFF) demultiplexer, or a single-mode waveguide. In various embodiments, the mux/demux of the waveguides shown herein may be capable of de-multiplexing both single-mode and multi-mode beams.

Additionally, although some components of the assemblies and waveguide elements are illustrated in FIGS. 7-40 as being planar rectangles or formed of rectangular solids, cuboid, and/or rhomboids, this is simply for ease of illustration, and embodiments of these assemblies, in particular embodiments of the core and or cladding, or embodiments of other portions of the core ribs, may be curved, rounded, or otherwise irregularly shaped as dictated by, and sometimes inevitable due to, the manufacturing processes used to fabricate various components Some of which are illustrated in FIGS. 7-40 do not represent an exhaustive set of arrangements of waveguides and cladding surrounding thereof in a manner to provide temperature insensitively in an optical waveguide, but merely provide examples of such arrangements. Although particular arrangements of materials are discussed with reference to FIGS. 7-40 illustrating example optical assemblies, in some embodiments, various intermediate materials may be included in various portions of the assemblies of these figures.

Note that FIGS. 7-40 are intended to show relative arrangements of the components within their assemblies, and that, in general, such assemblies may include other components that are not illustrated (e.g., various interfacial layers or various other components related to, e.g., optical functionality, electrical connectivity, or thermal mitigation). For example, in some further embodiments, the optical waveguide assemblies as shown in FIGS. 7-40 may include multiple inputs and outputs including dielectric slab waveguides or free propagation regions on opposite sides of the waveguides. In another example, the optical waveguides can be bundled together at predetermined varying lengths thereby producing an array waveguide, array waveguide grating, or other photonic circuit, such as, a PIC.

In some embodiments, the waveguide may be disposed or fabricated on a support structure which may be or may otherwise include a silicon interposer, and the conductive pathways through the support structure may be through-silicon vias. Silicon may have a desirably low coefficient of thermal expansion compared with other dielectric materials that may be used, and thus may limit the degree to which the support structure expands and contracts during temperature changes relative to such other materials (e.g., polymers having higher coefficients of thermal expansion). A silicon interposer may also help the support structure achieve a desirably small line width.

Conductive vias and/or lines that provide the conductive pathways to any photonic assembly in/on the support structure may be formed using any suitable techniques. Examples of such techniques may include subtractive fabrication techniques, additive or semi-additive fabrication techniques, single Damascene fabrication techniques, dual Damascene fabrication techniques, or any other suitable techniques. In some embodiments, layers of insulator material, such as e.g. oxide material or nitride material, may insulate various structures in the conductive pathways from proximate structures, and/or may serve as etch stops during fabrication. In some embodiments, additional layers, such as e.g. diffusion barrier layers or/and adhesion layers may be disposed between conductive material and proximate insulating material. Diffusion barrier layers may reduce diffusion of the conductive material into the insulating material. Adhesion layers may improve mechanical adhesion between the conductive material and the insulating material.

Fabrication techniques may further include other manufacturing operations related to fabrication of other components of the optical assemblies described herein, or any devices that may include optical waveguide assemblies as described herein. For example, the etching method described herein may include various cleaning operations, surface planarization operations (e.g., using chemical mechanical polishing), operations for surface roughening, operations to include barrier and/or adhesion layers as desired, and/or operations for incorporating the optical waveguides as described herein in, or with, an integrated circuit (IC) component, a computing device, or any desired structure or device. Fabrication may include an optional process of encapsulating the entire assembly. For example, the process may include providing a layer of a suitable dielectric material over the optical waveguide as shown in and of the FIGS., e.g., to reduce or minimize oxygen, moisture, or various other external compounds reaching the any electrical component and/or other components of the photonic circuit package.

In some embodiments, the waveguide array maybe mounted on a circuit board or a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board. In other embodiments, the circuit board may be a non-PCB substrate.

In some embodiment, coupling components may electrically and mechanically couple a package-on-interposer structure to the circuit board, and may include solder balls, male and female portions of a socket, an adhesive, an underfill material, and/or any other suitable electrical and/or mechanical coupling structure.

The package-on-interposer structure may include an IC package coupled to an interposer by coupling components. The coupling components may take any suitable form for the application, such as the forms discussed above with reference to the coupling components. The interposer may be formed of an epoxy resin, a fiberglass-reinforced epoxy resin, a ceramic material, or a polymer material such as polyimide. In some implementations, the interposer may be formed of alternate rigid or flexible materials that may include the same materials described above for use in a semiconductor substrate, such as silicon, germanium, and other group III-V and group IV materials. The interposer may include metal interconnects and vias, including but not limited to through-substrate vias (TSVs). The interposer may further include embedded devices, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency (RF) devices, power amplifiers, power management devices, antennas, arrays, sensors, and microelectromechanical systems (MEMS) devices may also be formed on the interposer. The package-on-interposer structure may take the form of any of the package-on-interposer structures known in the art.

Example Devices and Components

Figure 41:
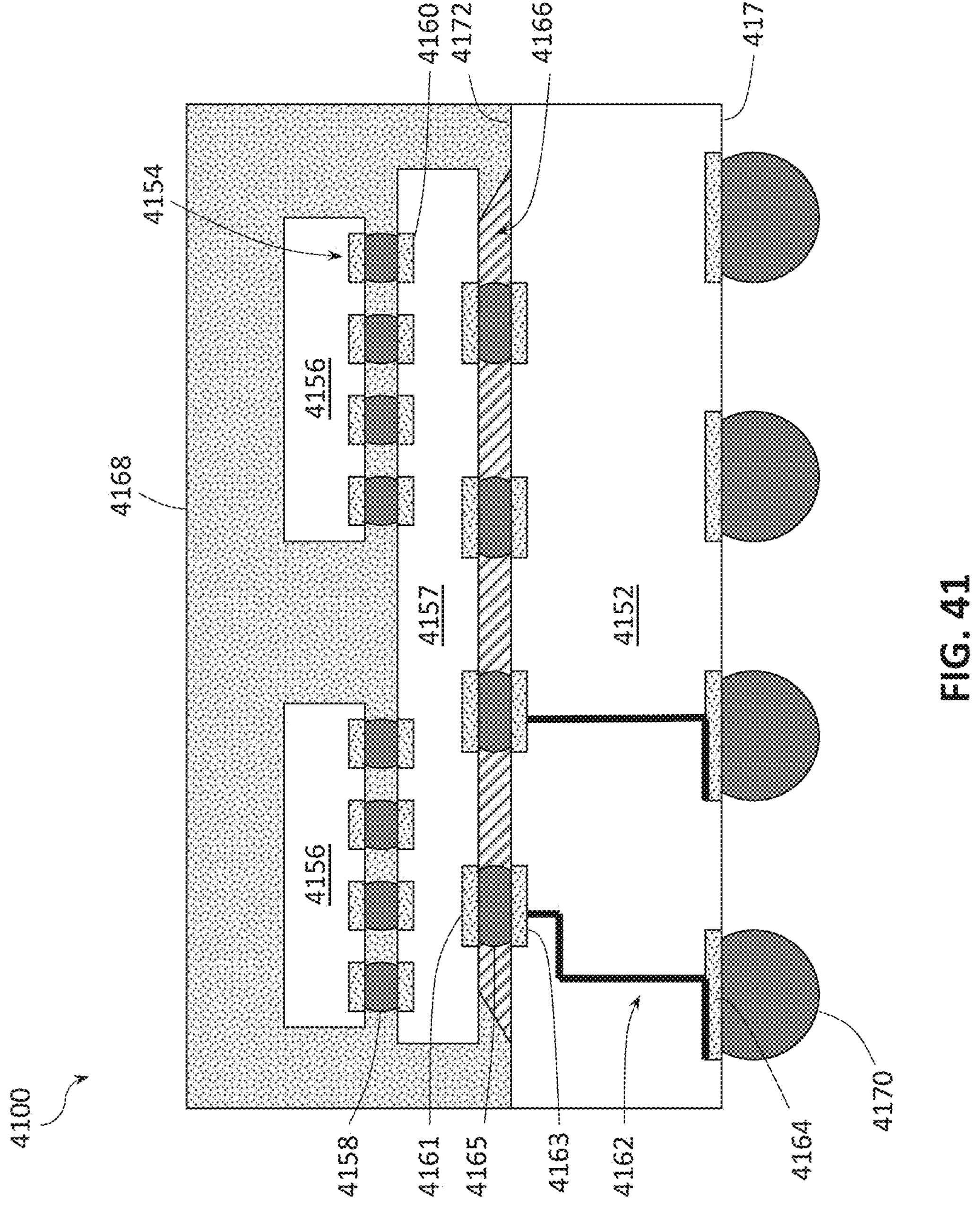
FIG. 41 is a cross-sectional side view of a device package that may include one or more optical waveguides, in accordance with any of the embodiments disclosed herein.
Figure 42:
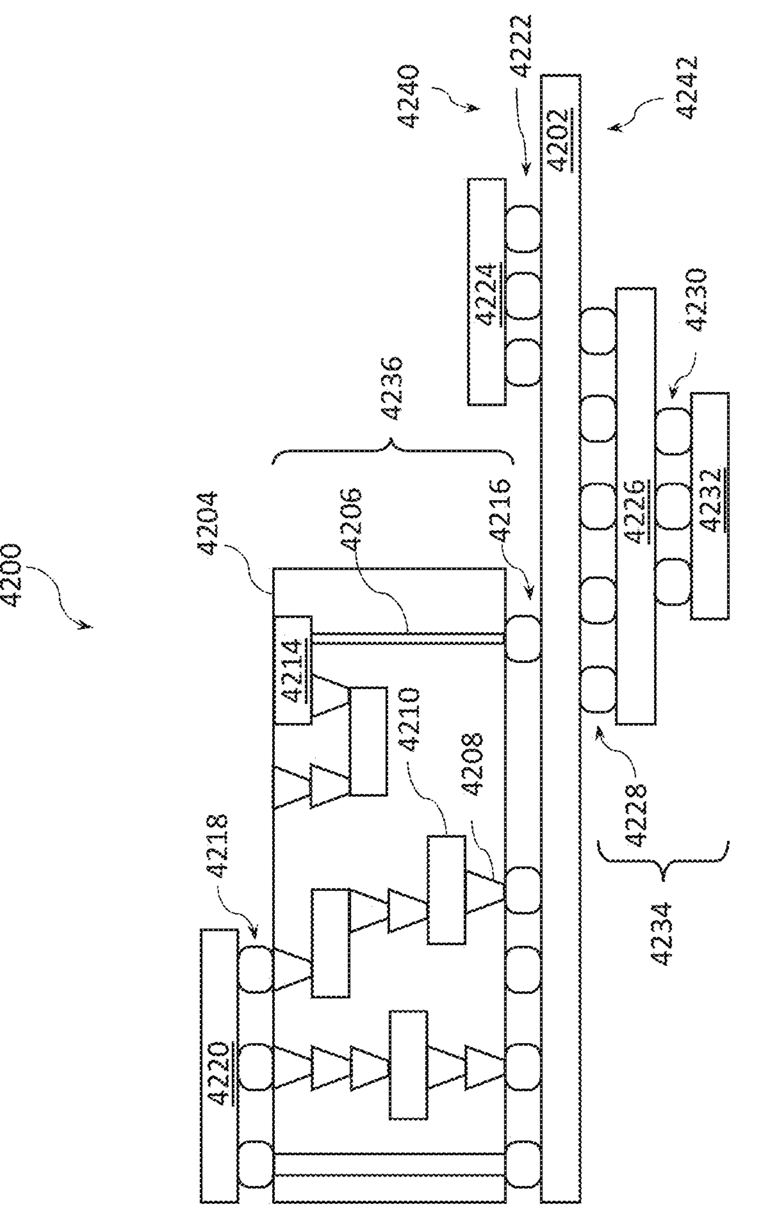
FIG. 42 is a cross-sectional side view of a device package that may include one or more optical waveguides, in accordance with any of the embodiments disclosed herein.
Figure 43:
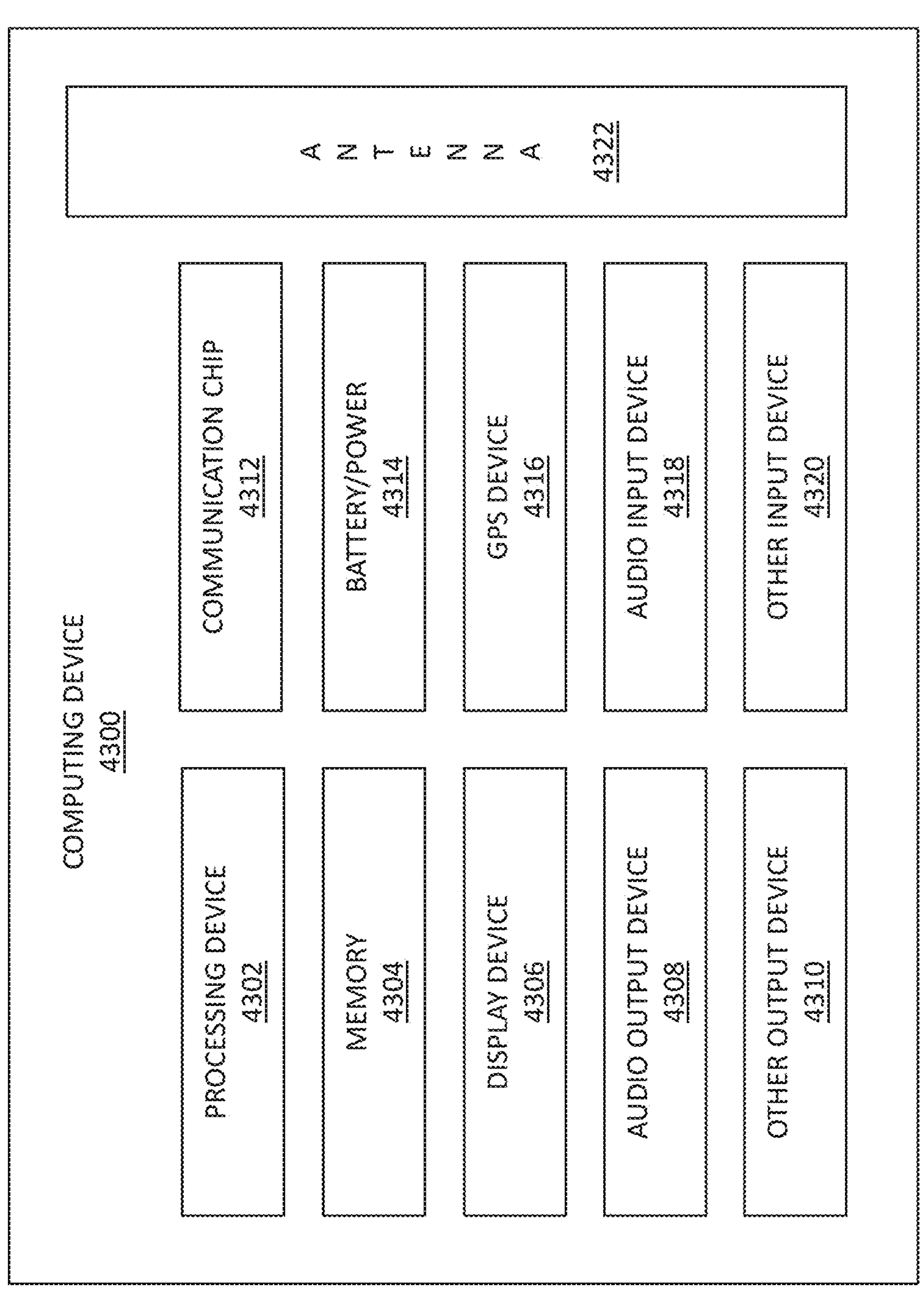
FIG. 43 is a block diagram of an example computing device that may include one or more optical waveguides, in accordance with any of the embodiments disclosed herein.

The optical waveguides disclosed herein, e.g., any of the embodiments of the waveguide configurations shown in FIGS. 7-40 or any further embodiments described herein, may be included in any suitable electronic/photonic component. FIGS. 41-43 illustrate various examples of packages, assemblies, and devices that may be used with or include any of the optical waveguides, AWG, and/or PICs as disclosed herein.

FIG. 41 is a side, cross-sectional view of an example IC package 2200 that may include waveguides and AWG MUX/DEMUX devices in accordance with any of the embodiments disclosed herein. In some embodiments, the IC package 4100 may be a system-in-package (SiP).

As shown in FIG. 41, the package substrate 4152 may be formed of a dielectric material (e.g., a ceramic, a buildup film, an epoxy film having filler particles therein, etc.), and may have conductive pathways extending through the dielectric material between the face 4172 and the face 4174, or between different locations on the face 4172, and/or between different locations on the face 4174. These conductive pathways may take the form of any of the interconnect structures comprising lines and/or vias, e.g., as discussed above with reference to FIG. 1.

The package substrate 4152 may include conductive contacts 4163 that are coupled to conductive pathways 4162 through the package substrate 4152, allowing circuitry within the dies 4156 and/or the interposer 4157 to electrically couple to various ones of the conductive contacts 4164 (or to other devices included in the package substrate 4152, not shown).

The IC package 4100 may include an interposer 4157 coupled to the package substrate 4152 via conductive contacts 4161 of the interposer 4157, first-level interconnects 4165, and the conductive contacts 4163 of the package substrate 4152. The first-level interconnects 4165 illustrated in FIG. 41 are solder bumps, but any suitable first-level interconnects 4165 may be used, such as solder bumps, solder posts, or bond wires.

The IC package 4100 may include one or more dies 4156 coupled to the interposer 4157 via conductive contacts 4154 of the dies 4156, first-level interconnects 4158, and conductive contacts 4160 of the interposer 4157. The conductive contacts 4160 may be coupled to conductive pathways (not shown) through the interposer 4157, allowing circuitry within the dies 4156 to electrically couple to various ones of the conductive contacts 4161 (or to other devices included in the interposer 4157, not shown). The first-level interconnects 4158 illustrated in FIG. 5 are solder bumps, but any suitable first-level interconnects 4158 may be used, such as solder bumps, solder posts, or bond wires. As used herein, a "conductive contact" may refer to a portion of electrically conductive material (e.g., metal) serving as an interface between different components; conductive contacts may be recessed in, flush with, or extending away from a surface of a component, and may take any suitable form (e.g., a conductive pad or socket).

In some embodiments, an underfill material 4166 may be disposed between the package substrate 4152 and the interposer 4157 around the first-level interconnects 4165, and a mold compound 4168 may be disposed around the dies 4156 and the interposer 4157 and in contact with the package substrate 4152. In some embodiments, the underfill material 4166 may be the same as the mold compound 4168. Example materials that may be used for the underfill material 4166 and the mold compound 4168 are epoxy mold materials, as suitable. Second-level interconnects 4170 may be coupled to the conductive contacts 4164. The second-level interconnects 4170 illustrated in FIG. 41 are solder balls (e.g., for a ball grid array arrangement), but any suitable second-level interconnects 4170 may be used (e.g., pins in a pin grid array arrangement or lands in a land grid array arrangement). The second-level interconnects 4170 may be used to couple the IC package 4100 to another component, such as a circuit board (e.g., a motherboard), an interposer, or another IC package, as known in the art and as discussed below with reference to FIG. 42.

In various embodiments, any of the dies 4156 may be aligned with the optical input device 2, as described herein. The details of the optical input device 2 are not specifically shown in FIG. 41 in order to not clutter the drawing. However, in all such embodiments, for the dies 4156 that are implemented, the conductive contacts 4154 of the die 4156 may be analogous to the conductive contacts described above, the interconnects 4158 may be analogous to the interconnects described above, and the conductive contacts 4160 of the interposer 4157 may be analogous to the conductive contacts described above.

In embodiments in which the IC package 4100 includes multiple dies 4156, the IC package 4100 may be referred to as a multi-chip package (MCP). The dies 4156 may include circuitry to perform any desired functionality. For example, besides one or more of the dies 4156 being as described herein, one or more of the dies 4156 may be logic dies (e.g., silicon-based dies), one or more of the dies 4156 may be memory dies (e.g., high bandwidth memory), etc. In some embodiments, any of the dies 4156 which are implemented may include one or more associated optical input devices 2, e.g., as discussed with reference to FIG. 1. In some embodiments, at least some of the dies 4156 may not include any waveguides or AWG MUX/DEMUX devices as described herein.

Although the IC package 4100 illustrated in FIG. 41 is a flip-chip package, other package architectures may be used. For example, the IC package 4100 may be a ball grid array (BGA) package, such as an embedded wafer-level ball grid array (eWLB) package. In another example, the IC package 4100 may be a wafer-level chip scale package (WLCSP) or a panel fan-out (FO) package. Although two dies 4156 are illustrated in the IC package 4100 of FIG. 41, an IC package 4100 may include any desired number of dies 4156. An IC package 4100 may include additional passive components, such as surface-mount resistors, capacitors, and inductors disposed on the first face 4172 or the second face 4174 of the package substrate 4152, or on either face of the interposer 4157. More generally, an IC package 4100 may include any other active or passive components known in the art.

In some embodiments, no interposer 4157 may be included in the IC package 4100; instead, the dies 4156 may be coupled directly to the conductive contacts 4163 at the face 4172 by first-level interconnects 4165. In such embodiments, for the dies 4156 that are implemented as a PD die optically coupled to the optical input device 2, the conductive contacts 4154 of the dies 4156 may be analogous to the conductive contacts described above, the interconnects 4165 may be analogous to the interconnects described above, and the conductive contacts 4163 of the package substrate 4152 may be analogous to the conductive contacts described above.

FIG. 42 is a cross-sectional side view of an IC device assembly 2300 that may include components having one or more waveguides and AWG MUX/DEMUX devices in accordance with any of the embodiments disclosed herein. The IC device assembly 4200 includes a number of components disposed on a circuit board 4202 (which may be, e.g., a motherboard). The IC device assembly 4200 includes components disposed on a first face 4240 of the circuit board 4202 and an opposing second face 4242 of the circuit board 4202; generally, components may be disposed on one or both faces 4240 and 4242. In particular, any suitable ones of the components of the IC device assembly 4200 may include any of the one or more waveguides and AWG MUX/DEMUX devices in accordance with any of the embodiments disclosed herein; e.g., any of the IC packages discussed below with reference to the IC device assembly 4200 may take the form of any of the embodiments of the IC package 4100 discussed above with reference to FIG. 41.

In some embodiments, the circuit board 4202 may be a PCB including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 4202. In other embodiments, the circuit board 4202 may be a non-PCB substrate.

FIG. 41 illustrates that, in some embodiments, the IC device assembly 4200 may include a package-on-interposer structure 4236 coupled to the first face 4240 of the circuit board 4202 by coupling components 4216. The coupling components 4216 may electrically and mechanically couple the package-on-interposer structure 4236 to the circuit board 4202, and may include solder balls (as shown in FIG. 6), male and female portions of a socket, an adhesive, an underfill material, and/or any other suitable electrical and/or mechanical coupling structure.

The package-on-interposer structure 4236 may include an IC package 4220 coupled to an interposer 4204 by coupling components 4218. The coupling components 4218 may take any suitable form for the application, such as the forms discussed above with reference to the coupling components 4216. In some embodiments, the IC package 4220 may be or include the IC package 4100, e.g., as described above with reference to FIG. 41. In some embodiments, the IC package 4220 may include at least one PD die as described herein, optically coupled to the optical input device 2, as described herein. The PD die and the optical input device 2 are not specifically shown in FIG. 42 in order to not clutter the drawing.

Although a single IC package 4220 is shown in FIG. 42, multiple IC packages may be coupled to the interposer 4204; indeed, additional interposers may be coupled to the interposer 4204. The interposer 4204 may provide an intervening substrate used to bridge the circuit board 4202 and the IC package 4220. Generally, the interposer 4204 may spread a connection to a wider pitch or reroute a connection to a different connection. For example, the interposer 4204 may couple the IC package 4220 to a BGA of the coupling components 4216 for coupling to the circuit board 4202.

In the embodiment illustrated in FIG. 42, the IC package 4220 and the circuit board 4202 are attached to opposing sides of the interposer 4204. In other embodiments, the IC package 4220 and the circuit board 4202 may be attached to a same side of the interposer 4204. In some embodiments, three or more components may be interconnected by way of the interposer 4204.

The interposer 4204 may be formed of an epoxy resin, a fiberglass-reinforced epoxy resin, a ceramic material, or a polymer material such as polyimide. In some implementations, the interposer 4204 may be formed of alternate rigid or flexible materials that may include the same materials described above for use in a semiconductor substrate, such as silicon, germanium, and other group III-V and group IV materials. The interposer 4204 may include metal interconnects 4208 and vias 4210, including but not limited to TSVs 4206. The interposer 4204 may further include embedded devices 4214, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as RF devices, power amplifiers, power management devices, antennas, arrays, sensors, and microelectromechanical systems (MEMS) devices may also be formed on the interposer 4204. The package-on-interposer structure 4236 may take the form of any of the package-on-interposer structures known in the art.

In some embodiments, the IC device assembly 4200 may include an IC package 4224 coupled to the first face 4240 of the circuit board 4202 by coupling components 4241. The coupling components 4241 may take the form of any of the embodiments discussed above with reference to the coupling components 4216, and the IC package 4224 may take the form of any of the embodiments discussed above with reference to the IC package 4220.

In some embodiments, the IC device assembly 4200 may include a package-on-package structure 4234 coupled to the second face 4242 of the circuit board 4202 by coupling components 4228. The package-on-package structure 4234 may include an IC package 4226 and an IC package 4232 coupled together by coupling components 4230 such that the IC package 4226 is disposed between the circuit board 4202 and the IC package 4232. The coupling components 4228 and 4230 may take the form of any of the embodiments of the coupling components 4216 discussed above, and the IC packages 4226 and/or 4232 may take the form of any of the embodiments of the IC package 4220 discussed above. The package-on-package structure 4234 may be configured in accordance with any of the package-on-package structures known in the art.

FIG. 43 is a block diagram of an example computing device 4300 that may include one or more components having one or more optical waveguides accordance with any of the embodiments disclosed herein. For example, any suitable ones of the components of the computing device 4300 may include a photonic integrated circuit, in accordance with any of the embodiments disclosed herein. In yet another example, any one or more of the components of the computing device 4300 may include or array waveguide and/or AWG.

A number of components are illustrated in FIG. 43 as included in the computing device 4300, but any one or more of these components may be omitted or duplicated, as suitable for the application. In some embodiments, some or all of the components included in the computing device 4300 may be attached to one or more motherboards. In some embodiments, some or all of these components are fabricated onto a single system-on-a-chip (SoC) die.

Additionally, in various embodiments, the computing device 4300 may not include one or more of the components illustrated in FIG. 43, but the computing device 4300 may include interface circuitry for coupling to the one or more components. For example, the computing device 4300 may not include a display device 4306, but may include display device interface circuitry (e.g., a connector and driver circuitry) to which a display device 4306 may be coupled. In another set of examples, the computing device 4300 may not include an audio input device 4318 or an audio output device 4308, but may include audio input or output device interface circuitry (e.g., connectors and supporting circuitry) to which an audio input device 4318 or audio output device 4308 may be coupled.

The computing device 4300 may include a processing device 4302 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 4302 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. The computing device 4300 may include a memory 4304, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 4304 may include memory that shares a die with the processing device 4302. This memory may be used as cache memory and may include embedded dynamic random-access memory (eDRAM) or spin transfer torque magnetic random-access memory (STT-M RAM).

In some embodiments, the computing device 4300 may include a communication chip 4312 (e.g., one or more communication chips). For example, the communication chip 4312 may be configured for managing wireless communications for the transfer of data to and from the computing device 4300. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 4312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 4312 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 4312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 4312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 4312 may operate in accordance with other wireless protocols in other embodiments. The computing device 4300 may include an antenna 4322 to facilitate wireless communications and/or to receive other wireless communications (such as AM or FM radio transmissions).

In some embodiments, the communication chip 4312 may manage wired communications, such as electrical, optical, or any other suitable communication protocols (e.g., the Ethernet). As noted above, the communication chip 4312 may include multiple communication chips. For instance, a first communication chip 4312 may be dedicated to shorter-range wireless communications such as Wi-Fi or Bluetooth, and a second communication chip 4312 may be dedicated to longer-range wireless communications such as global positioning system (GPS), EDGE, GPRS, CDMA, WiMAX, LTE, EV-DO, or others. In some embodiments, a first communication chip 4312 may be dedicated to wireless communications, and a second communication chip 4312 may be dedicated to wired communications.

The computing device 4300 may include battery/power circuitry 4314. The battery/power circuitry 4314 may include one or more energy storage devices (e.g., batteries or capacitors) and/or circuitry for coupling components of the computing device 4300 to an energy source separate from the computing device 4300 (e.g., AC line power).

The computing device 4300 may include a display device 4306 (or corresponding interface circuitry, as discussed above). The display device 4306 may include any visual indicators, such as a heads-up display, a computer monitor, a projector, a touchscreen display, a liquid crystal display (LCD), a light-emitting diode display, or a flat panel display, for example.

The computing device 4300 may include an audio output device 4308 (or corresponding interface circuitry, as discussed above). The audio output device 4308 may include any device that generates an audible indicator, such as speakers, headsets, or earbuds, for example.

The computing device 4300 may include an audio input device 4318 (or corresponding interface circuitry, as discussed above). The audio input device 4318 may include any device that generates a signal representative of a sound, such as microphones, microphone arrays, or digital instruments (e.g., instruments having a musical instrument digital interface (MIDI) output).

The computing device 4300 may include a GPS device 4316 (or corresponding interface circuitry, as discussed above). The GPS device 4316 may be in communication with a satellite-based system and may receive a location of the computing device 4300, as known in the art.

The computing device 4300 may include another output device 4310 (or corresponding interface circuitry, as discussed above). Examples of the other output device 4310 may include an audio codec, a video codec, a printer, a wired or wireless transmitter for providing information to other devices, or an additional storage device.

The computing device 4300 may include another input device 4320 (or corresponding interface circuitry, as discussed above). Examples of the other input device 4320 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 4300 may have any desired form factor, such as a handheld or mobile computing device (e.g., a cell phone, a smart phone, a mobile Internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, the computing device 4300 may be any other electronic device that processes data.

SELECT EXAMPLES

The following paragraphs provide various examples of the embodiments disclosed herein.

Example 1 provides a waveguide device that include a core and claddings. The waveguide may have a support structure and a waveguide. The waveguide comprises a core material, a first cladding material, a second cladding material, and a third cladding material, the first, second, and third cladding materials having a lower permittivity (and, thus, lower index of refraction) than the core material and surrounding the core material to enable propagation of an electromagnetic wave in the core material; wherein a TOC of the second cladding material is negative and a TOC of the third cladding material is positive, and further wherein in a transverse cross-section of the waveguide (e.g., a cross-sectional plane that is substantially perpendicular to the support structure and substantially perpendicular to a direction of propagation of the electromagnetic wave in the core material): the core material is between the first cladding material and at least one of the second cladding material and the third cladding material, at least a portion of the second cladding material is adjacent to (e.g., in contact with) a first portion of the core material, and at least a portion of the third cladding material is (directly) adjacent to (e.g., in contact with, juxtaposed) a second portion of the core material.

Example 2 provides the waveguide device according to example 1, wherein the portion of the third cladding material is coplanar with the core material.

Example 3 provides the waveguide device according to example 2, wherein: the portion of the third cladding material is a first portion of the third cladding material, and at least a portion of the second cladding material is between the core material and a second portion of the third cladding material.

Example 4 provides the waveguide device according to any one of examples 2-3, wherein: a further portion of the third cladding material is adjacent to (e.g., in contact with) a third portion of the core material and is coplanar with the core material.

Example 5 provides the waveguide device according to example 4, wherein: the core material is between the portion of the third cladding material and the further portion of the third cladding material.

Example 6 provides the waveguide device according to example 1, wherein the core material is between the first cladding material and the portion of the third cladding material.

Example 7 provides the waveguide device according to any one of the preceding examples, wherein a TOC of the first cladding material is positive.

Example 8 provides an apparatus comprising a support structure, and a waveguide having a transverse cross-section, the waveguide comprising: a core having a negative TOC, a first cladding material having a first positive TOC and directly adjacent to the core, and a second cladding material having a second positive TOC, wherein one side of the core and first cladding are coplanar.

Example 9 provides an apparatus comprising a support structure, and a waveguide having a transverse cross-section, the waveguide comprising: an interleaved core having interleavings of materials having negative and positive TOCs, a first cladding material having a first positive TOC and directly adjacent to the core, and a second cladding material having a second positive TOC, wherein one side of the core and first cladding are coplanar.

Example 10 provides the apparatus of example 9, wherein the interleavings have an orientation which is orthogonal to the one side of the core and first cladding which are coplanar.

Example 11 provides the apparatus of example 9, wherein the interleavings have a planar orientation which is parallel to the one side of the core and first cladding which are coplanar.

Example 12 provides the apparatus according to any one of examples 9-11, wherein at least two other sides of the core are directly adjacent to the core relative to the transverse cross-section of the waveguide.

Example 13 provides an apparatus comprising a support structure, and a waveguide having a transverse cross-section, the waveguide comprising a core having positive TOC, a first cladding material having a first positive TOC, a second cladding material having a second positive TOC, and a third cladding material having a negative TOC, the third cladding surrounding the core relative to the transverse cross-section, wherein one side of the first and third claddings are coplanar.

Example 14 provides an apparatus comprising a support structure, and a waveguide having a transverse cross-section, the waveguide comprising a core having positive TOC, a first cladding material having a first positive TOC, wherein one side of the first cladding and core are coplanar, a second cladding material having a second positive TOC, and a third cladding material having a negative TOC and disposed in between the core and second cladding.

Example 15 provides an apparatus comprising a support structure, and a waveguide having a transverse cross-section, the waveguide comprising: a core having positive TOC, a first cladding material having a first positive TOC, a second cladding material having a second positive TOC, and a third cladding material having a first and second portion both with negative TOCs, wherein the first portion of the third cladding is disposed in between the core and second cladding and second portion of the third cladding material is disposed in between the core and first cladding.

Example 16 provides an apparatus comprising a support structure, and a waveguide having a transverse cross-section, the waveguide comprising: an interleaved core having interleavings of negative and positive TOCs, a first cladding material having a first positive TOC, wherein one side of the core and first cladding are coplanar; and a second cladding material having a second positive TOC and directly adjacent to the core, wherein the interleavings have a planar orientation which is parallel to the one side of the core and first cladding which are coplanar.

Example 17 provides the apparatus according to any one of examples 8-16, wherein the waveguide is disposed on the support structure.

Example 18 provides the apparatus according to any one of examples 8-16, wherein support structure is a substrate and the waveguide is disposed thereon.

Example 19 provides the apparatus according to any one of examples 8-16, wherein the waveguide exhibits a combined TOC which is other between −0.5 and 0.5.

Example 20 provides the apparatus according to any one of examples 8-16, wherein the waveguide is comprised by an array waveguide grating.

Example 21 provides the apparatus according to any one of examples 8-16, wherein the array waveguide grating is a flat-top array waveguide grating.

Example 22 provides the apparatus according to any one of examples 8-16, wherein exhibits a substantially positive TOC as a whole.

Example 23 provides the apparatus according to any one of examples 8-16, wherein exhibits a substantially negative TOC as a whole.

Example 24 provides the apparatus according to any one of examples 8-16, wherein the waveguide in substantially lossless in a fundamental mode.

Example 25 provides the apparatus according to any one of examples 8-16, wherein the core extends the width of the waveguide, relative to the cross-section.

Example 26 provides the apparatus of example 9, wherein the interleavings have a longitudinal orientation relative to a direction of propagation.

Example 27 provides a system comprising a support structure, a first slab waveguide, a second slab waveguide, and a waveguide coupled to the first and second slab waveguides comprising, a core having a positive TOC, a first cladding material having a first positive TOC and directly adjacent to the core, a second cladding material having a second positive TOC, and a third cladding material having a negative thermo-optic coefficient, the third cladding material sharing at least one side with core.

Example 28 provides a system comprising a waveguide according to any one of examples 1-26 and a first free propagation region.

Example 29 provides a system according to example 28 wherein the first free propagation region is configured as a multiplexer.

Example 30 provides a system according to example 29 further comprising a second free propagation region.

Example 31 provides a system according to example 30 wherein the second free propagation region is configured as a demultiplexer.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A photonic integrated circuit (PIC), comprising:

a waveguide, comprising:

a core having interleavings of materials having negative and positive thermo-optic coefficients;

a first cladding material directly adjacent to the core; and a second cladding material directly adjacent to the core;

wherein one side of the core and one side of the first cladding material are coplanar, and wherein the interleavings have a planar orientation which is parallel to the one side of the core and to the one side of the first cladding material.

2. The PIC of claim 1, wherein at least two other sides of the core are substantially perpendicular to the one side of the core.

3. The PIC of claim 1, wherein at least some of the interleavings have different thicknesses.

4. The PIC of claim 1, wherein an effective thermo-optic coefficient of the waveguide is between −0.5 and 0.5.

5. The PIC of claim 1, wherein the waveguide is an array waveguide.

6. The PIC of claim 1, wherein the waveguide has a negative thermo-optic coefficient.

7. The PIC of claim 1 wherein the core extends a width of the waveguide.

8. The PIC of claim 1, wherein:

the first cladding material has a first positive thermo-optic coefficient, and the second cladding material has a second positive thermo-optic coefficient.

9. The PIC of claim 1, wherein the waveguide includes a flat-top array waveguide grating.

10. A photonic integrated circuit (PIC), comprising:

a waveguide, comprising:

a core having interleavings of materials having negative and positive thermo-optic coefficients;

a first cladding material directly adjacent to the core; and a second cladding material directly adjacent to the core;

wherein the interleavings have a longitudinal orientation relative to a direction of propagation of light in the waveguide.

11. The PIC of claim 10, wherein one side of the core and one side of the first cladding material are coplanar.

12. The PIC of claim 11, wherein:

the first cladding material has a first positive thermo-optic coefficient, and the second cladding material has a second positive thermo-optic coefficient.

13. The PIC of claim 10, wherein:

the first cladding material has a first positive thermo-optic coefficient, and the second cladding material has a second positive thermo-optic coefficient.

14. The PIC of claim 10, wherein at least some of the interleavings have different thicknesses.

15. The PIC of claim 10, wherein the waveguide is an array waveguide.

16. The PIC of claim 10, wherein the waveguide includes a flat-top array waveguide grating.

17. The PIC of claim 10, wherein the waveguide has a negative thermo-optic coefficient.

18. An integrated circuit (IC) package, comprising:

a photonic integrated circuit (PIC); and a further component coupled with the PIC, wherein the PIC includes a waveguide, comprising:

a core having interleavings of materials having negative and positive thermo-optic coefficients, a first cladding material directly adjacent to the core, and a second cladding material directly adjacent to the core, wherein one side of the core and one side of the first cladding material are coplanar, wherein the interleavings have a planar orientation which is parallel to the one side of the core and to the one side of the first cladding material.

19. The IC package of claim 18, wherein the further component is a package substrate, an interposer, or a circuit board.

20. The IC package of claim 18, further comprising:

a die, wherein the PIC is part of the die.

* * * * *